(12) United States Patent
Kim et al.

(10) Patent No.: US 12,380,305 B2
(45) Date of Patent: Aug. 5, 2025

(54) SECURITY CODE

(71) Applicants: Electronics and Telecommunications Research Institute, Daejeon (KR); Postech Research and Business Development Foundation, Pohang-si (KR)

(72) Inventors: Soo-Jung Kim, Daejeon (KR); Junsuk Rho, Pohang-si (KR); Sung-Hoon Hong, Daejeon (KR); Byoungsu Ko, Pohang-si (KR); Doa Kim, Daejeon (KR); Jaehyuck Jang, Pohang-si (KR); Chunghwan Jung, Pohang-si (KR)

(73) Assignees: Electronics and Telecommunications Research Institute, Daejeon (KR); Postech Research and Business Development Foundation, Pohang-si (KR)

( * ) Notice: Subject to any disclaimer, the term of this patent is extended or adjusted under 35 U.S.C. 154(b) by 163 days.

(21) Appl. No.: 18/112,283

(22) Filed: Feb. 21, 2023

(65) Prior Publication Data
US 2023/0281416 A1  Sep. 7, 2023

(30) Foreign Application Priority Data

Mar. 3, 2022 (KR) .................... 10-2022-0027302
Oct. 5, 2022 (KR) .................... 10-2022-0127348

(51) Int. Cl.
*G06K 19/06* (2006.01)

(52) U.S. Cl.
CPC .................... *G06K 19/06037* (2013.01)

(58) Field of Classification Search
CPC .................................... G06K 19/06037
USPC .................................................. 235/494
See application file for complete search history.

(56) References Cited

U.S. PATENT DOCUMENTS

| 9,387,718 | B2 | 7/2016 | Mayrhofer et al. |
| 9,868,873 | B2 | 1/2018 | Iftime et al. |
| 10,032,014 | B2 | 7/2018 | Dixit et al. |
| 10,152,662 | B2 | 12/2018 | Ryu et al. |

(Continued)

FOREIGN PATENT DOCUMENTS

| CN | 105046309 | 9/2018 |
| CN | 113687527 | 11/2021 |

(Continued)

OTHER PUBLICATIONS

Kim et al., "Generation of highly integrated multiple vivid colours using a three-dimensional broadband perfect absorber", Scientific Reports, Oct. 16, 2019, 9 total pages, vol. 9.

(Continued)

*Primary Examiner* — Daniel A Hess
(74) *Attorney, Agent, or Firm* — KILE PARK REED & HOUTTEMAN PLLC

(57) ABSTRACT

Provided is a security code. The security code including a first region and a second region includes a metal layer, a first dielectric pattern provided on the metal layer in the first region, a polymer pattern provided on the metal layer in the second region, a first metal pattern provided on the dielectric pattern, and a second metal pattern provided on the polymer pattern, wherein the polymer pattern includes a material different from that of the first dielectric pattern, and a thickness of the polymer pattern is different from a thickness of the first dielectric pattern.

17 Claims, 25 Drawing Sheets

(56) References Cited

U.S. PATENT DOCUMENTS

| | | |
|---|---|---|
| 10,628,647 B1 | 4/2020 | Rossier et al. |
| 2012/0024956 A1 | 2/2012 | Chen |
| 2017/0076127 A1 | 3/2017 | Arce et al. |
| 2017/0261662 A1 | 9/2017 | Lee et al. |
| 2020/0056999 A1 | 2/2020 | Read De Alaniz et al. |
| 2021/0396659 A1 | 12/2021 | Jang et al. |

FOREIGN PATENT DOCUMENTS

| | | |
|---|---|---|
| JP | 2009-274428 | 11/2009 |
| JP | 6617460 | 12/2019 |
| KR | 10-2013-0129139 | 11/2013 |
| KR | 10-2014-0085481 | 7/2014 |
| KR | 10-2016-0062891 | 6/2016 |
| KR | 10-2019-0027305 | 3/2019 |
| KR | 10-2019-0128228 | 11/2019 |
| KR | 10-2020-0061049 | 6/2020 |
| KR | 10-2198249 | 1/2021 |

OTHER PUBLICATIONS

Jung et al., "Disordered-nanoparticle-based etalon for ultrafast humidity-responsive colorimetric sensors and anti-counterfeiting displays", Science Advances, Mar. 11, 2022, 8 total pages, vol. 8, No. 10.

SECURITY CODE

CROSS-REFERENCE TO RELATED APPLICATIONS

This U.S. non-provisional patent application claims priority under 35 U.S.C. § 119 of Korean Patent Application Nos. 10-2022-0027302, filed on Mar. 3, 2022, and 10-2022-0127348, filed on Oct. 5, 2022, the entire contents of which are hereby incorporated by reference.

BACKGROUND

The present disclosure herein relates to a security code, and more particularly, to a three-dimensional security code capable of storing two or more pieces of information according to a change in reflected color using a material that changes in volume according to a change in an external environment.

Various types of security codes (QR code, color code, etc.) are used as required means for information, payment, security systems, and the like. Commonly used QR codes include a positioning pattern, an alignment pattern, and a data pattern, allow detection of the position of a QR code through the positioning pattern and indicate a QR code scan direction through the alignment pattern. The data pattern is formed by separating a light reflection region and a light absorption region with a contrast difference between a QR code color and a background color. In general, black color and white color are used as the QR code color and the background color, but QR codes obtained by changing the QR code color and background color with a contrast difference therebetween are also used. Recently, with the advent of color codes that can be designed in various shapes and colors using four colors, security codes with enhanced visual effect have been developed.

SUMMARY

The present disclosure provides a three-dimensional security code having a self-color-changing effect.

An embodiment of the inventive concept provides a security code including a first region and a second region, the security code including: a metal layer; a first dielectric pattern provided on the metal layer in the first region; a polymer pattern provided on the metal layer in the second region; a first metal pattern provided on the dielectric pattern; and a second metal pattern provided on the polymer pattern, wherein the polymer pattern includes a material different from that of the first dielectric pattern, and a thickness of the polymer pattern is different from a thickness of the first dielectric pattern.

In an embodiment, the polymer pattern may include a contractable or expandable material.

In an embodiment, the security code may further include an inter-layer dielectric pattern between the metal layer and the second metal pattern in the second region, and the inter-layer dielectric pattern may be provided on or below the polymer pattern.

In an embodiment, the polymer pattern and the inter-layer dielectric pattern may be provided in plurality and alternately laminated.

In an embodiment, the security code may further include: a third region spaced apart from the first region; a second dielectric pattern provided on the metal layer in the third region; and a third metal pattern on the second dielectric pattern.

In an embodiment, the thickness of the first dielectric pattern may be different from a thickness of the second dielectric pattern.

In an embodiment, at least one of the thicknesses of the first and second dielectric patterns may be the same as the thickness of the polymer pattern.

In an embodiment, the polymer pattern may include at least one of silk protein, chitosan, cellulose, PVA, or hydrogel complex.

In an embodiment, the first dielectric pattern may include a material different from that of the second dielectric pattern.

According to an embodiment, the metal layer may include at least one of Ag, Au, Cu, Al, Ni, Cr, or Pb.

According to an embodiment, the first dielectric pattern may include at least one of $SiO_2$, $Ai_2O_3$, $TiO_2$, SOG, PMMA, or PBMA.

In an embodiment of the inventive concept, a security code includes: a metal layer including a first region, a second region, a third region, and a fourth region; a first dielectric pattern provided on the metal layer in the first region; a second dielectric pattern provided on the metal layer in the second region; a first polymer pattern provided on the metal layer in the third region; a second polymer pattern provided on the metal layer in the fourth region; a first metal pattern provided on the first dielectric pattern; a second metal pattern provided on the second dielectric pattern; a third metal pattern provided on the first polymer pattern; and a fourth metal pattern provided on the second polymer pattern, wherein the first to fourth regions are provided at different positions, and the first and second polymer patterns include an expandable or contractable material.

In an embodiment, a thickness of the first dielectric pattern may be different from a thickness of the second dielectric pattern, and a thickness of the first polymer pattern may be different from a thickness of the second polymer pattern.

In an embodiment, either one of thicknesses of the first and second dielectric patterns may be the same as either one of thicknesses of the first and second polymer patterns.

In an embodiment, the first polymer pattern may include a material different from that of the second polymer pattern.

In an embodiment, the security code may further include: a first inter-layer dielectric pattern provided between the metal layer and the third metal pattern in the third region; and a second inter-layer dielectric pattern provided between the metal layer and the fourth metal pattern in the fourth region, wherein the first inter-layer dielectric pattern may be provided on or below the first polymer pattern, and the second inter-layer dielectric pattern may be provided on or below the second polymer pattern.

In an embodiment, the first and second inter-layer dielectric patterns may include at least one of $SiO_2$, $Ai_2O_3$, $TiO_2$, SOG, PMMA, or PBMA, and a thickness of the first inter-layer dielectric pattern may be different from a thickness of the second inter-layer dielectric pattern.

In an embodiment of the inventive concept, a method of manufacturing a security code includes: forming a metal layer; forming a dielectric pattern on the metal layer; forming a polymer pattern on the metal layer; and forming a metal pattern on each of the dielectric pattern and the polymer pattern, wherein the forming of the polymer pattern includes depositing a polymer layer and performing a lift-off process.

In an embodiment, the forming of the polymer pattern may include: preparing a chitosan solution; filtering the chitosan solution; and performing a spin coating process using the filtered chitosan solution.

In an embodiment, the forming of the metal pattern may include: preparing a metal nanoparticle solution; performing a spin coating process using the metal nanoparticle solution; and dipping into a solution containing ammonium thiocyanate.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, embodiments of the inventive concept will be described with reference to the accompanying drawings so that the configuration and effects of the inventive concept are sufficiently understood. However, the inventive concept is not limited to the embodiments described below, but may be implemented in various forms and may allow various changes and modifications. Rather, the embodiments are provided so that this disclosure will be thorough and complete, and will fully convey the scope of the inventive concept to those skilled in the art. In the accompanying drawings, the dimensions of elements are magnified for convenience, and the scale ratios among the elements may be exaggerated or reduced. Furthermore, the terms used to describe the embodiments of the inventive concept may be interpreted as the meanings known in the art unless the terms are defined differently.

For convenience, the upward direction of the drawings is referred to as being upward, and a face oriented in the upward direction of the drawings is referred to as an upper face. The downward direction of the drawings is referred to as being downward, and a face oriented in the downward direction of the drawings is referred to as a lower face. Furthermore, the direction from the left side to the right side of the drawings is referred to as a horizontal direction.

When a layer is referred to as being "on" another layer, it can be directly on the other layer, or intervening layers may also be present.

Hereinafter, embodiments of the inventive concept will be described in detail with reference to the accompanying drawings.

Figure 1A:
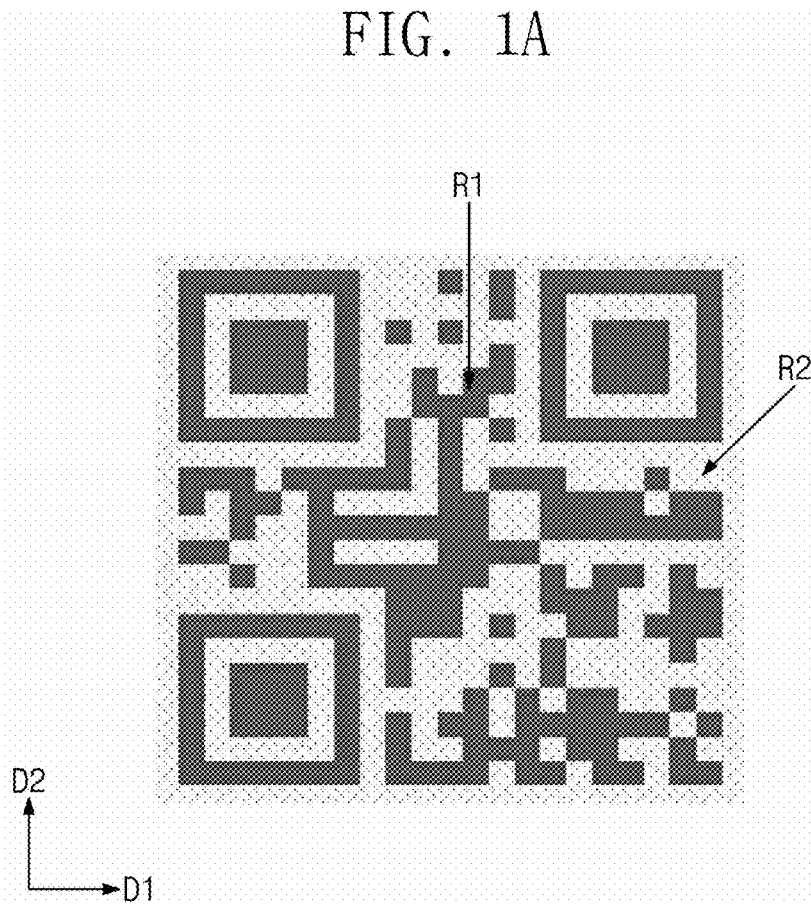
FIG. 1A is a plan view of a security code according to an embodiment of the inventive concept.

FIG. 1A is a plan view of a security code according to an embodiment of the inventive concept. FIGS. 1B to 1E are cross-sectional views of the security code according to the embodiment of FIG. 1A.

The security code according to embodiments of the inventive concept may be a QR code, color code, or bar code, and, for example, the security code illustrated in FIGS. 1A to 1E is a QR code.

Referring to FIG. 1A, the security code may include one QR code. The QR code may include a code region and a background region, and the code region may include a positioning pattern, an alignment pattern, and a data pattern. The background region is a region other than the code region, and may be a portion without QR code information.

In detail, the security code may include first and second regions R1 and R2. The code region may be the first region R1, and the background region may be the second region R2. The first region R1 and the second region R2 may be provided at different positions. That is, the first region R1 and the second region R2 may not overlap each other. The first region R1 having a form of a combination of several pixels may form a particular pattern. The second region R2 may be positioned between the first regions R1 or around the first region R1.

Figure 1B:
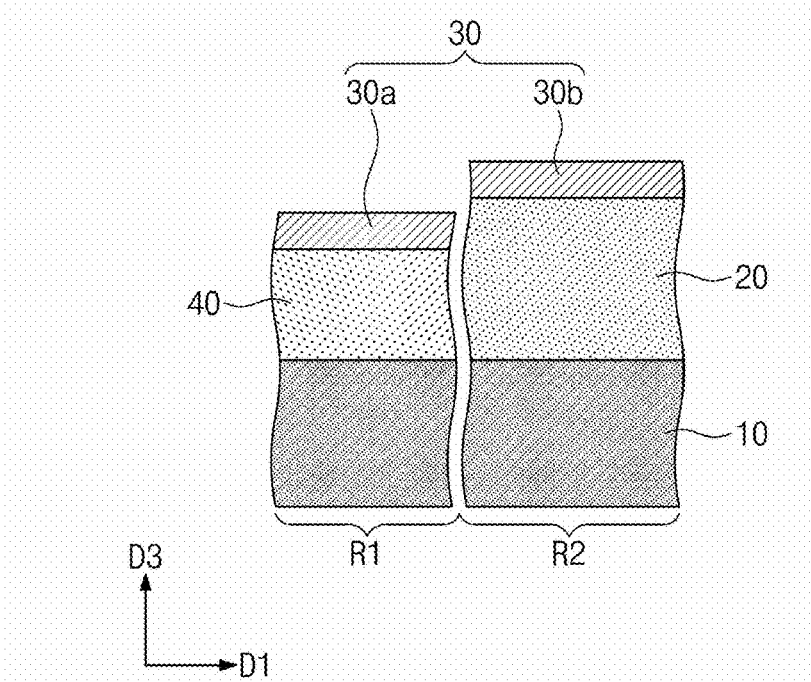
FIGS. 1B to 1E are cross-sectional views of the security code according to the embodiment of FIG. 1A.

Referring to FIG. 1B, the security code may include a metal layer 10, a polymer pattern 20, a dielectric pattern 40, and a metal pattern 30 in the first and second regions R1 and R2. The metal pattern 30 may include a first metal pattern 30a and a second metal pattern 30b.

The metal layer 10 may be provided on a substrate (not shown). The metal layer 10 may include, for example, a metal material such as Ag, Au, Cu, Al, Ni, Cr, and/or Pb. The metal layer 10 may have a form of nanoparticles or a metal thin film. The metal layer 10 may have a thickness of about 50 nm to about 100 nm in a third direction D3. The metal layer 10 may be deposited by e-beam evaporator and/or sputtering.

The metal pattern 30 may be provided on each of the polymer pattern 20 and the dielectric pattern 40. In detail, the first metal pattern 30a may be provided on the dielectric pattern 40 in the first region R1. The second metal pattern 30b may be provided on the polymer pattern 20 in the second region R2. The first and second metal patterns 30a and 30b may have substantially the same thickness in the third direction D3. Thicknesses of the first and second metal patterns 30a and 30b may be within about 50 nm. The first and second metal patterns 30a and 30b may be formed by spin coating using a solution containing metal nanoparticles.

For example, the first and second metal patterns 30a and 30b may be nanoclusters in which surfaces of Ag nanoparticles are surrounded by thiocyanate (SCN) ligands. The Ag nanoparticles may have a diameter of about 10 nm. The nanocluster is a porous membrane due to SCN ligands having a short chain and may allow gases to pass therethrough.

The polymer pattern 20 may be provided on the metal layer 10 in the second region R2. The polymer pattern 20 may be a material that expands or contracts according to a change in an external environment, such as humidity, temperature, pressure, or the like. For example, the polymer pattern 20 may include a polymer material such as silk protein, chitosan, cellulose, PVA, hydrogel complex, or the like. That is, a thickness of the polymer pattern 20 in the third direction D3 may change reversibly or irreversibly according to a change in an external environment.

The dielectric pattern 40 may be provided on the metal layer 10 in the first region R1. The dielectric pattern 40 may include, for example, an oxide such as $SiO_2$, $Ai_2O_3$, and $TiO_2$, spin-on glass (SOG) series, and polymer resin such as polymethylmethacrylate (PMMA) and polybutylmethacrylate (PBMA). The dielectric pattern 40 may be formed using a plasma enhanced chemical vapor deposition (PECVD) method. A thickness of the dielectric pattern 40 in the third direction D3 may be different from the thickness of the polymer pattern 20 in the third direction D3. Therefore, a level of the first metal pattern 30a may be different from a level of the second metal pattern 30b.

Figure 1C:
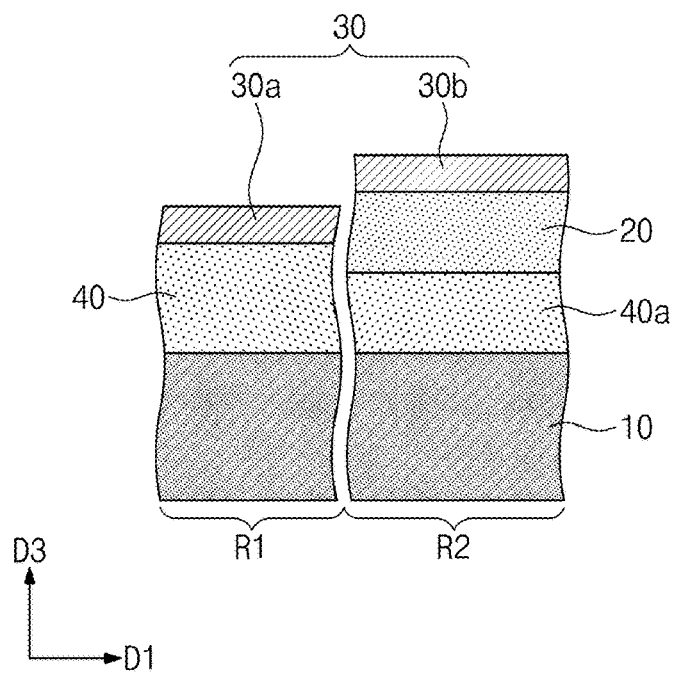
Figure 1D:
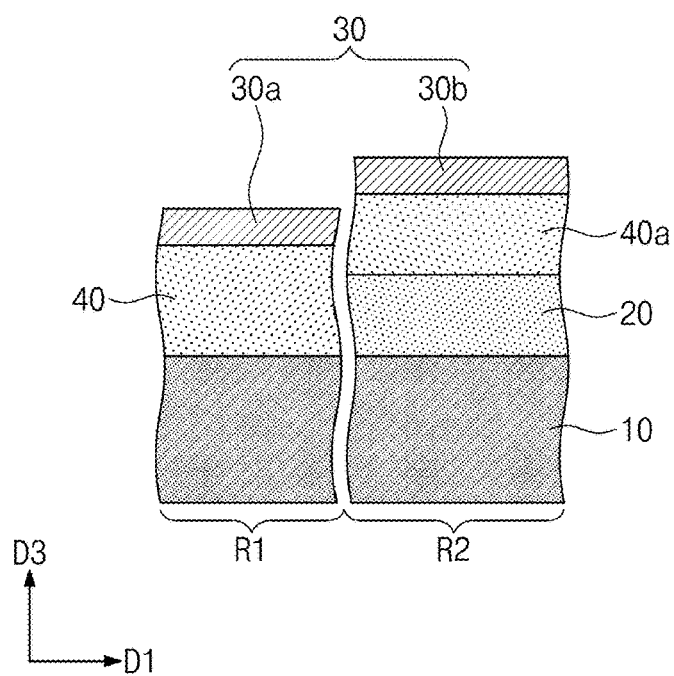

Referring to FIGS. 1C and 1D, the security code may further include an inter-layer dielectric pattern 40a between the metal layer 10 and the second metal pattern 30b in the second region R2. The inter-layer dielectric pattern 40a may have a characteristic of less optical loss. A wavelength of light reflected by Fabry-Perot resonance may be selected by adjusting permittivity of the inter-layer dielectric pattern 40a. The inter-layer dielectric pattern 40a may include an oxide such as $SiO_2$, $Ai_2O_3$, and $TiO_2$, spin-on glass (SOG) series, and polymer resin such as polymethylmethacrylate (PMMA) and polybutylmethacrylate (PBMA). That is, the inter-layer dielectric pattern 40a may include the same material as the dielectric pattern 40.

As illustrated in FIG. 1C, the inter-layer dielectric pattern 40a may be provided between the metal layer 10 and the polymer pattern 20. Alternatively, as illustrated in FIG. 1D, the inter-layer dielectric pattern 40a may be provided between the polymer pattern 20 and the second metal pattern 30b.

Figure 1E:
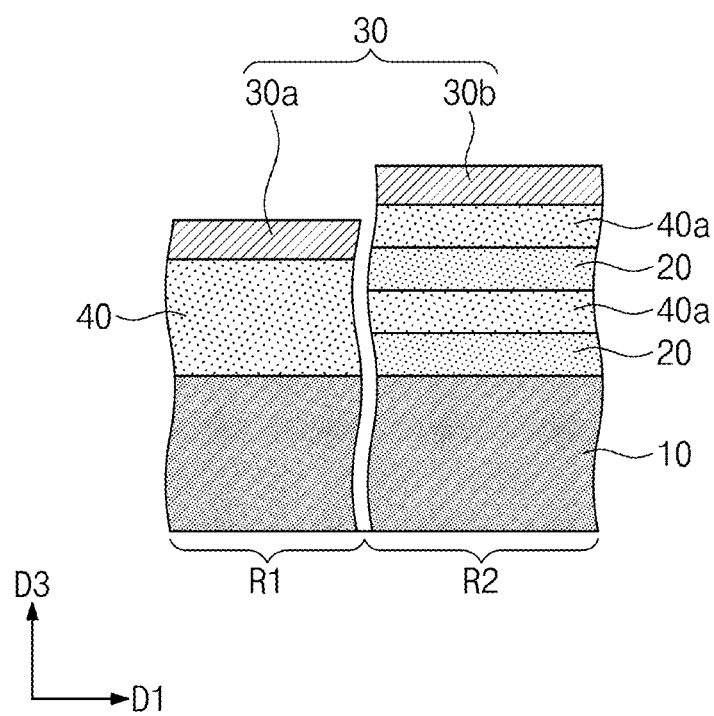

Referring to FIG. 1E, the security code may include a plurality of inter-layer dielectric patterns 40a and a plurality of polymer patterns 20 between the metal layer 10 and the second metal pattern 30b in the second region R2. The plurality of inter-layer dielectric patterns 40a and the plurality of polymer patterns 20 may be alternately laminated, thus forming a multi-layer structure.

Figure 2A:
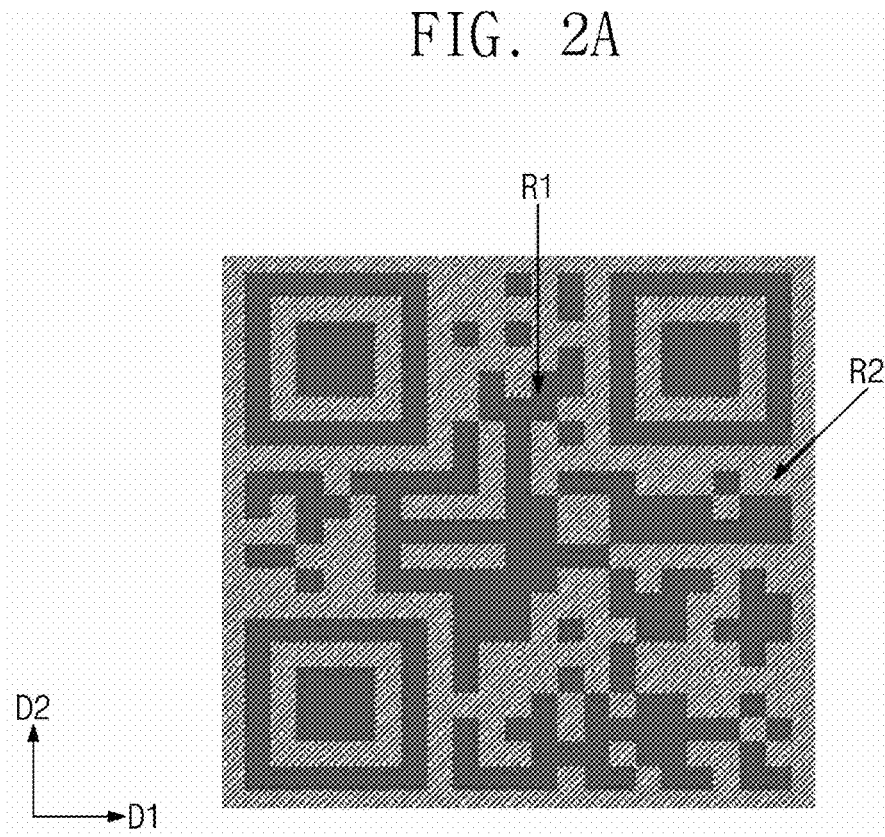
FIGS. 2A and 2B are diagrams for describing an operation principle of the security code of FIG. 1A.
Figure 2B:
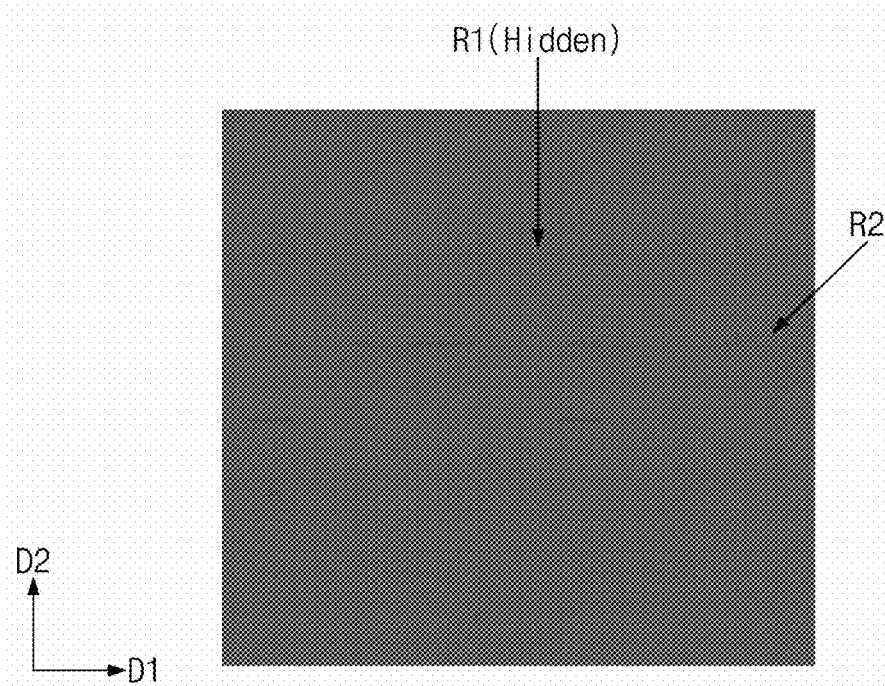

FIGS. 2A and 2B are diagrams for describing an operation principle of the security code of FIG. 1A.

Referring to FIGS. 1B and 2A, the thickness of the polymer pattern 20 in the third direction D3 may increase or decrease due to a change in an external environment such as humidity, pressure, or temperature. Therefore, color of the second region R2 of the security code may change according to a change in a wavelength of light reflected by Fabry-Perot resonance.

For example, under a particular RH a % condition of low relative humidity, the thickness of the dielectric pattern 40 in the third direction D3 may be different from the thickness of the polymer pattern 20 in the third direction D3. Therefore, wavelengths of light reflected in the first region R1 and the second region R2 may differ. Therefore, colors exhibited in the first region R1 and the second region R2 differ, and thus data of the security code may be recognized.

Referring to FIG. 2B, under RH b % condition of high relative humidity, the thickness of the dielectric pattern 40 in the third direction D3 and the thickness of the polymer pattern 20 in the third direction D3 may be substantially the same, or, even if the thicknesses differ, there is a difference of permittivity therebetween, and thus the wavelengths of reflected light may be the same or similar, unlike the illustration of FIG. 2A. Therefore, the wavelengths of light reflected in the first region R1 and the second region R2 may be the same or similar. Therefore, colors exhibited in the first region R1 and the second region R2 are the same or similar, and thus data of the security code may fail to be recognized.

Figure 3A:
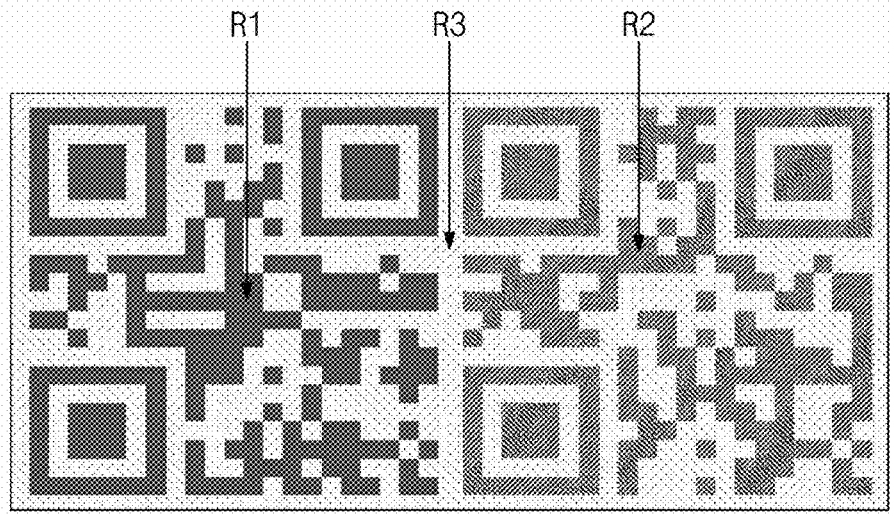
FIG. 3A is a plan view of a security code according to an embodiment of the inventive concept.

FIG. 3A is a plan view of a security code according to an embodiment of the inventive concept. FIGS. 3B to 3E are cross-sectional views of the security code according to the embodiment of FIG. 3A.

Hereinafter, for convenience, descriptions that are the same as those provided above with reference to FIGS. 1A to 1E will not be provided, and differences will be described in detail.

Figure 3B:
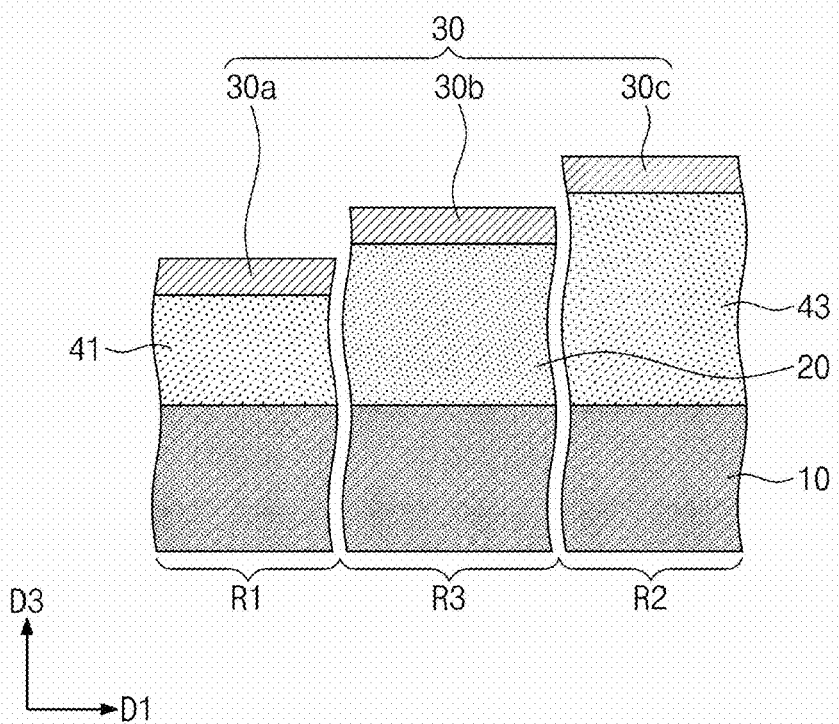
FIGS. 3B to 3E are cross-sectional views of the security code according to the embodiment of FIG. 3A.

Referring to FIGS. 3A and 3B, the security code may include two separate QR codes. In detail, the security code may include first to third regions R1 to R3. The code region may include the first region R1 and the second region R2, and the background region may include the third region R3. That is, first data may be provided in the first region R1, second data may be provided in the second region R2, and the first data and second data may not be provided in the third region R3. The first region R1, the second region R2, and the third region R3 may be provided at different positions. The first region R1 and second region R2 having a form of a combination of several pixels may form a particular pattern. The third region R3 may be positioned between the first regions R1 and the second region R2 or around the first region R1 and the second region R2.

A first dielectric pattern 41 may be provided on the metal layer 10 in the first region R1. A second dielectric pattern 43 may be provided on the metal layer 10 in the second region R2. The polymer pattern 20 may be provided on the metal layer 10 in the third region R3.

Since the first region R1 represents the first data and the second region R2 represents the second data, the first region R1 and the second region R2 are required to exhibit different colors. That is, in order to render wavelengths of reflected light different, a thickness of the first dielectric pattern 41 in the third direction D3 may be different from a thickness of the second dielectric pattern 43 in the third direction D3. The first and second dielectric patterns 41 and 43 may include substantially the same material as the dielectric pattern 40 described with reference to FIG. 1B. Alternatively, the first dielectric pattern 41 may include a material different from that of the second dielectric pattern 43.

The thickness of the polymer pattern 20 in the third direction D3 may increase or decrease according to a change in an external environment. Therefore, according to an external environment, the thickness of the polymer pattern 20 in the third direction D3 may be the same as or different from the thickness of the first dielectric pattern 41 and/or the second dielectric pattern 43.

The metal pattern 30 may include first to third metal patterns 30a to 30c. The first metal pattern 30a may be provided on the first dielectric pattern 41 in the first region R1. The third metal pattern 30c may be provided on the second dielectric pattern 43 in the second region R2. The second metal pattern 30b may be provided on the polymer pattern 20 in the third region R3. The first to third metal patterns 30a to 30c may have substantially the same thickness in the third direction D3. Since the first and second dielectric patterns 41 and 43 and the polymer pattern 20 have different thicknesses in the third direction D3, the first to third metal patterns 30a to 30c may have different levels.

Figure 3C:
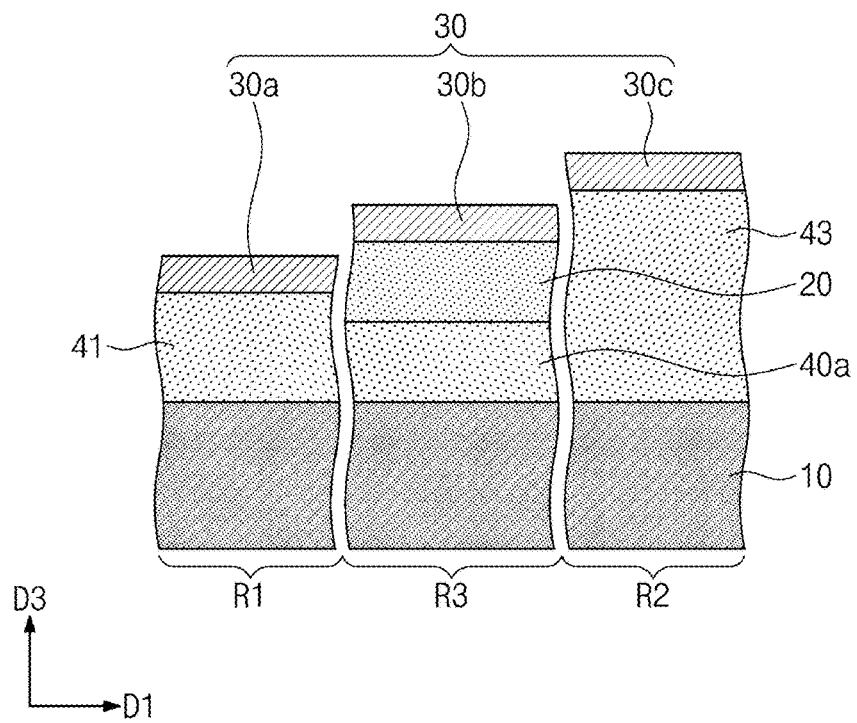
Figure 3D:
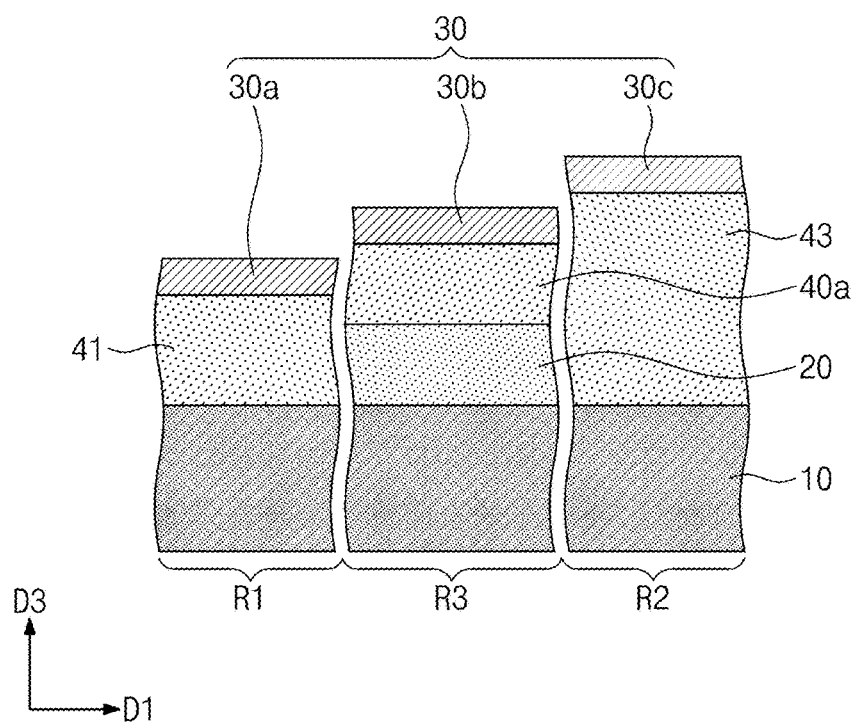

Referring to FIGS. 3C and 3D, the security code may further include the inter-layer dielectric pattern 40a between the metal layer 10 and the second metal pattern 30b in the third region R3. The inter-layer dielectric pattern 40a may include substantially the same material as the first dielectric pattern 41 and/or the second dielectric pattern 43. As illustrated in FIG. 3C, the inter-layer dielectric pattern 40a may be provided between the metal layer 10 and the polymer pattern 20. Alternatively, as illustrated in FIG. 3D, the inter-layer dielectric pattern 40a may be provided between the polymer pattern 20 and the second metal pattern 30b.

Figure 3E:
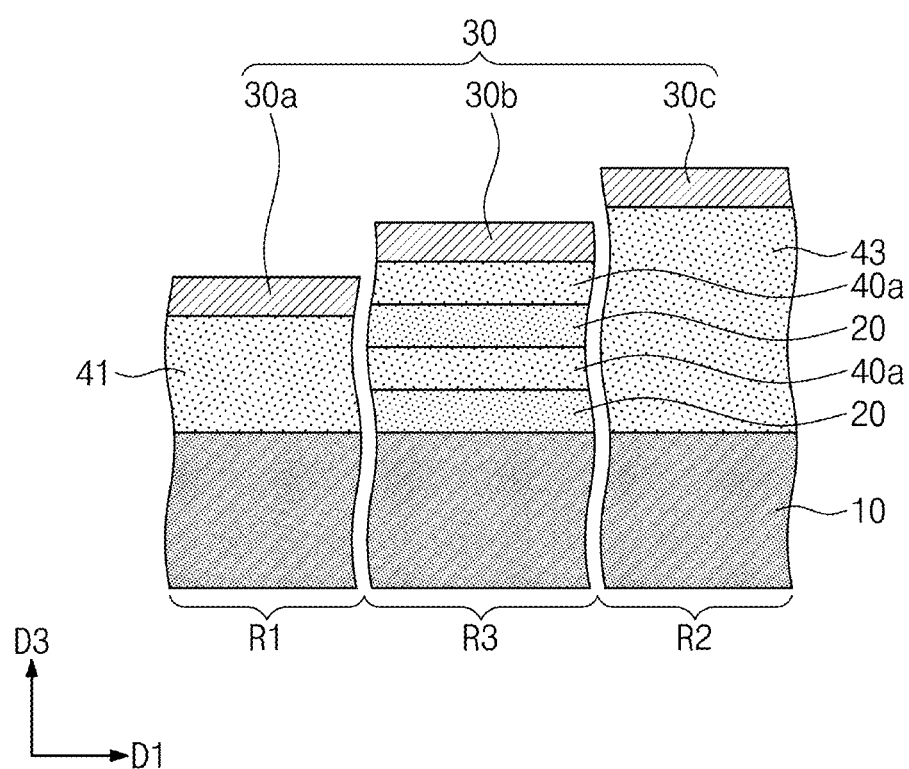

Referring to FIG. 3E, the security code may include a plurality of inter-layer dielectric patterns 40a and a plurality of polymer patterns 20. The plurality of inter-layer dielectric patterns 40a and the plurality of polymer patterns 20 may be alternately laminated, thus forming a multi-layer structure.

Figure 4A:
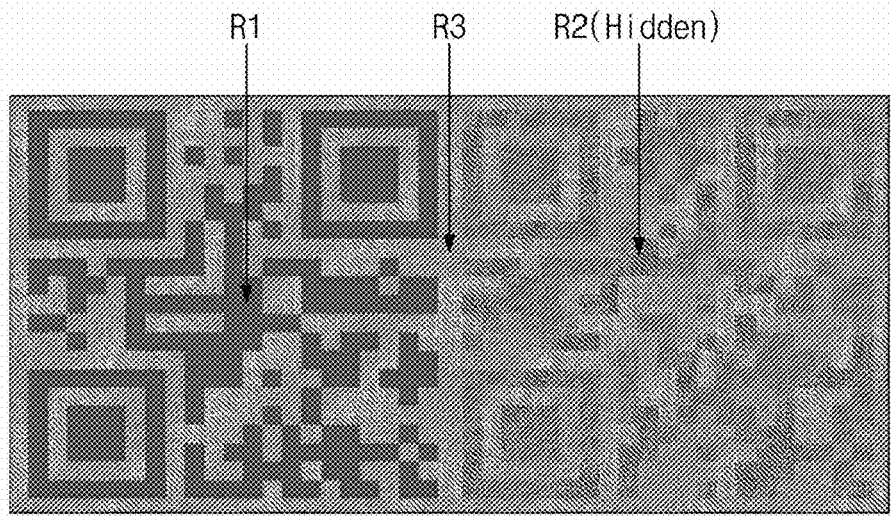
FIGS. 4A and 4B are diagrams for describing an operation principle of the security code of FIG. 3A.
Figure 4A:
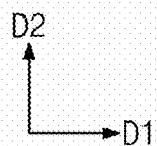
Figure 4B:
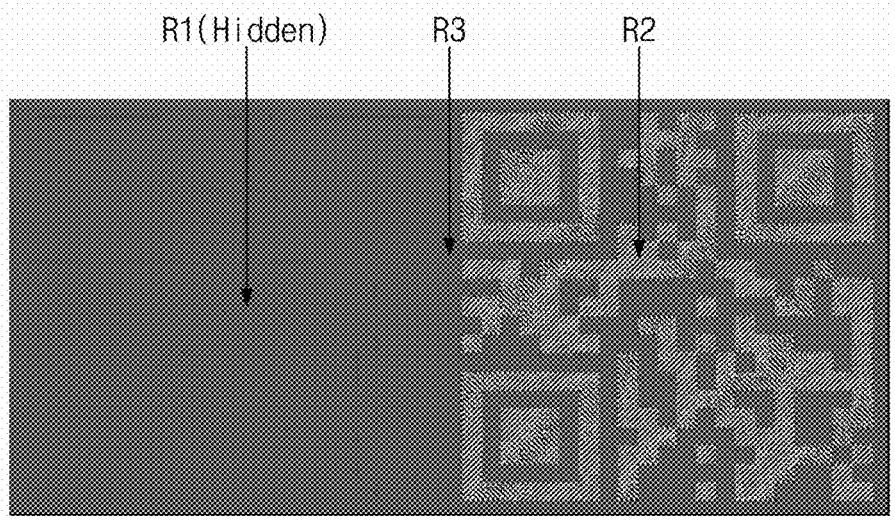
Figure 4B:
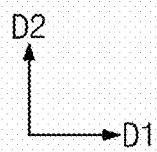

FIGS. 4A and 4B are diagrams for describing an operation principle of the security code of FIG. 3A.

Referring to FIGS. 3B and 4A, the first and second regions R1 and R2 exhibit different colors, and are not provided with the polymer pattern 20 and thus may not change in color according to a change in an external environment such as humidity, pressure, or temperature. On the contrary, the third region R3 is provided with the polymer pattern 20 and thus may change in color according to a change in a wavelength of light reflected by Fabry-Perot resonance.

For example, under a particular RH a % condition of low relative humidity, the thickness of the first dielectric pattern 41 in the third direction D3 may be different from the thickness of the polymer pattern 20 in the third direction D3. On the contrary, the thickness of the second dielectric pattern 43 in the third direction D3 and the thickness of the polymer pattern 20 in the third direction D3 may be substantially the same, or, even if the thicknesses differ, there is a difference of permittivity therebetween, and thus the wavelengths of reflected light may be the same or similar. That is, light of the same or similar wavelengths may be reflected in the second region R2 and the third region R3. Therefore, the color of the third region R3 may be the same as or similar to the color of the second region R2. Therefore, since the first region R1 and the third region R3 have different colors, and the third region R3 and the second region R2 have the same or similar colors, only the first data may be recognized.

Referring to FIG. 4B, under RH b % condition of high relative humidity, the thickness of the first dielectric pattern 41 in the third direction D3 and the thickness of the polymer pattern 20 in the third direction D3 may be substantially the same, and the thickness of the second dielectric pattern 43 in the third direction D3 may be different from the thickness of the polymer pattern 20 in the third direction D3, unlike the illustration of FIG. 4A. That is, light of the same or similar wavelengths may be reflected in the first region R1 and the third region R3. Therefore, the color of the third region R3 may be the same as or similar to the color of the first region R1. Therefore, since the first region R1 and the third region R3 have the same or similar colors, and the third region R3 and the second region R2 have different colors, only the second data may be recognized.

Figure 5A:
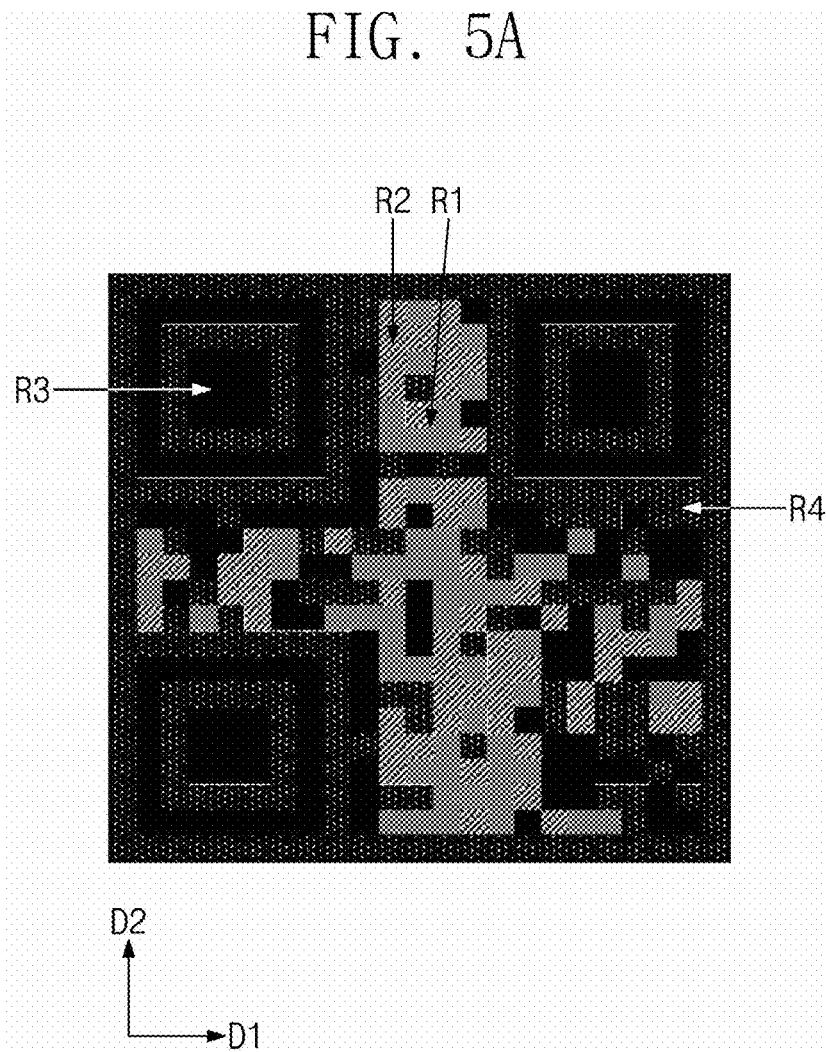
FIG. 5A is a plan view of a security code according to an embodiment of the inventive concept.

FIG. 5A is a plan view of a security code according to an embodiment of the inventive concept. FIGS. 5B to 5G are cross-sectional views of the security code according to the embodiment of FIG. 5A.

Hereinafter, for convenience, descriptions that are the same as those provided above with reference to FIGS. 1A to 1E will not be provided, and differences will be described in detail.

Figure 5B:
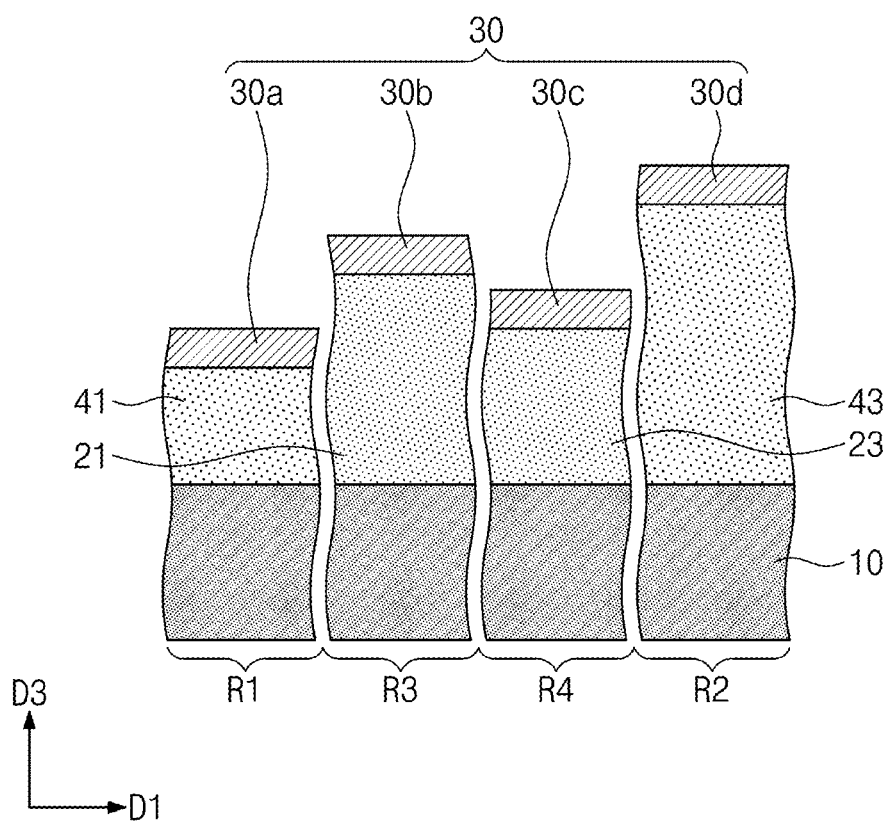
FIGS. 5B to 5G are cross-sectional views of the security code according to the embodiment of FIG. 5A.

Referring to FIGS. 5A and 5B, the security code may include two overlapping QR codes. The security code may include first to fourth regions R1 to R4. The code region may include the first to third regions R1 to R3. The background region may include the fourth region R4. In detail, only first data may be provided in the first region R1, only second data may be provided in the second region R2, and duplicate data of the first and second data may be provided in the third region R3. The duplicate data of the first and second data may be, for example, a positioning pattern and an alignment pattern in a QR code. The fourth region R4 may not be provided with the first and second data. The first to fourth regions R1 to R4 may be provided at different positions. The first to third regions R1 to R3 having a form of a combination of several pixels may form a particular pattern. The third and fourth region R3 and R4 may be positioned between the first regions R1 and/or the second regions R2 or around the first regions R1 and/or the second regions R2.

The first dielectric pattern 41 may be provided on the metal layer 10 in the first region R1. The second dielectric pattern 43 may be provided on the metal layer 10 in the second region R2. A first polymer pattern 21 may be provided on the metal layer 10 in the third region R3. A second polymer pattern 23 may be provided on the metal layer 10 in the fourth region R4.

Since the first region R1 represents only the first data and the second region R2 represents only the second data, the first region R1 and the second region R2 are required to exhibit different colors. That is, in order to render wavelengths of reflected light different, a thickness of the first dielectric pattern 41 in the third direction D3 may be different from a thickness of the second dielectric pattern 43 in the third direction D3. The first and second dielectric patterns 41 and 43 may include substantially the same material as the dielectric pattern 40 described with reference to FIG. 1B. Alternatively, the first dielectric pattern 41 may include a material different from that of the second dielectric pattern 43.

Since the third region R3 represents the duplicate data of the first and second data and the fourth region R4 represents a background region, the third region R3 and the fourth region R4 are required to exhibit different colors. That is, in order to render wavelengths of reflected light different, a thickness of the first polymer pattern 21 in the third direction D3 may be different from a thickness of the second polymer pattern 23 in the third direction D3. The first and second polymer patterns 21 and 23 may include substantially the same material as the polymer pattern 20 described with reference to FIG. 1B. That is, the thickness of the first and second polymer patterns 21 and 23 in the third direction D3 may increase or decrease according to a change in an external environment. Therefore, according to a change in an external environment, the thickness of the first polymer pattern 21 and/or the second polymer pattern 23 in the third direction D3 may be the same as or different from the thickness of the first dielectric pattern 41 and/or the second dielectric pattern 43.

The metal pattern 30 may include first to fourth metal patterns 30a to 30d. The first metal pattern 30a may be provided on the first dielectric pattern 41 in the first region R1. The fourth metal pattern 30d may be provided on the second dielectric pattern 43 in the second region R2. The second metal pattern 30b may be provided on the first polymer pattern 21 in the third region R3. The third metal pattern 30c may be provided on the second polymer pattern 23 in the fourth region R4. The first to fourth metal patterns 30a to 30d may have substantially the same thickness in the third direction D3. Since the first and second dielectric patterns 41 and 43 and the first and second polymer patterns 21 and 23 may have different thicknesses in the third direction D3, the first to fourth metal patterns 30a to 30d may have different levels.

Figure 5C:
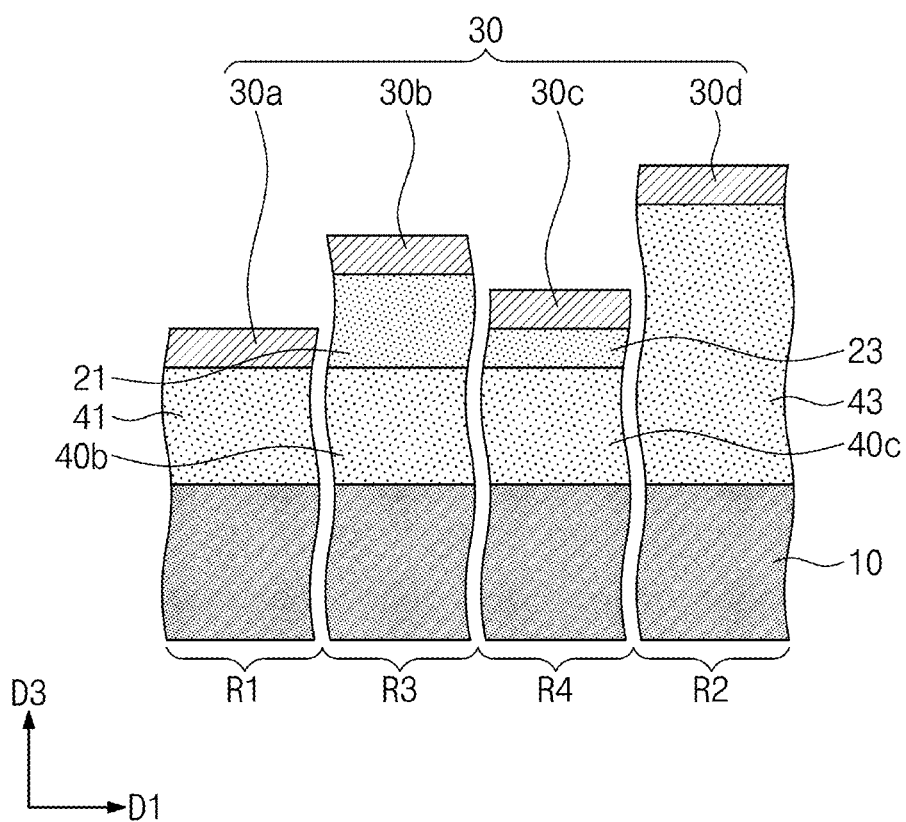
Figure 5D:
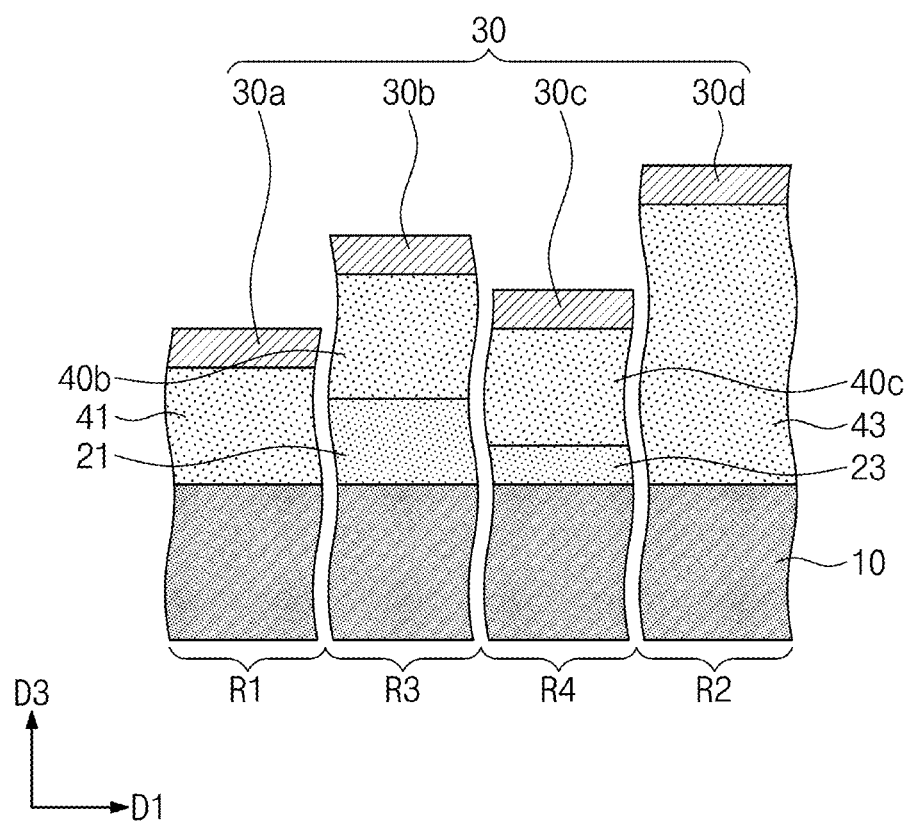

Referring to FIGS. 5C and 5D, the security code may further include a first inter-layer dielectric pattern 40b between the metal layer 10 and the second metal pattern 30b in the third region R3. The security code may further include a second inter-layer dielectric pattern 40c between the metal layer 10 and the third metal pattern 30c in the fourth region R4. The first and second inter-layer dielectric patterns 40b and 40c may include substantially the same material as the inter-layer dielectric pattern 40a described with reference to FIG. 1C. As illustrated in FIG. 5C, the first inter-layer dielectric pattern 40b and the second inter-layer dielectric pattern 40c may be provided between the metal layer 10 and the first polymer pattern 21 and between the metal layer 10 and the second polymer pattern 23. Alternatively, as illustrated in FIG. 5D, the first inter-layer dielectric pattern 40b and the second inter-layer dielectric pattern 40c may be provided between the second metal pattern 30b and the first polymer pattern 21 and between the third metal pattern 30c and the second polymer pattern 23. A thickness of the first inter-layer dielectric pattern 40b in the third direction D3 may be substantially the same as a thickness of the second inter-layer dielectric pattern 40c in the third direction D3.

Figure 5E:
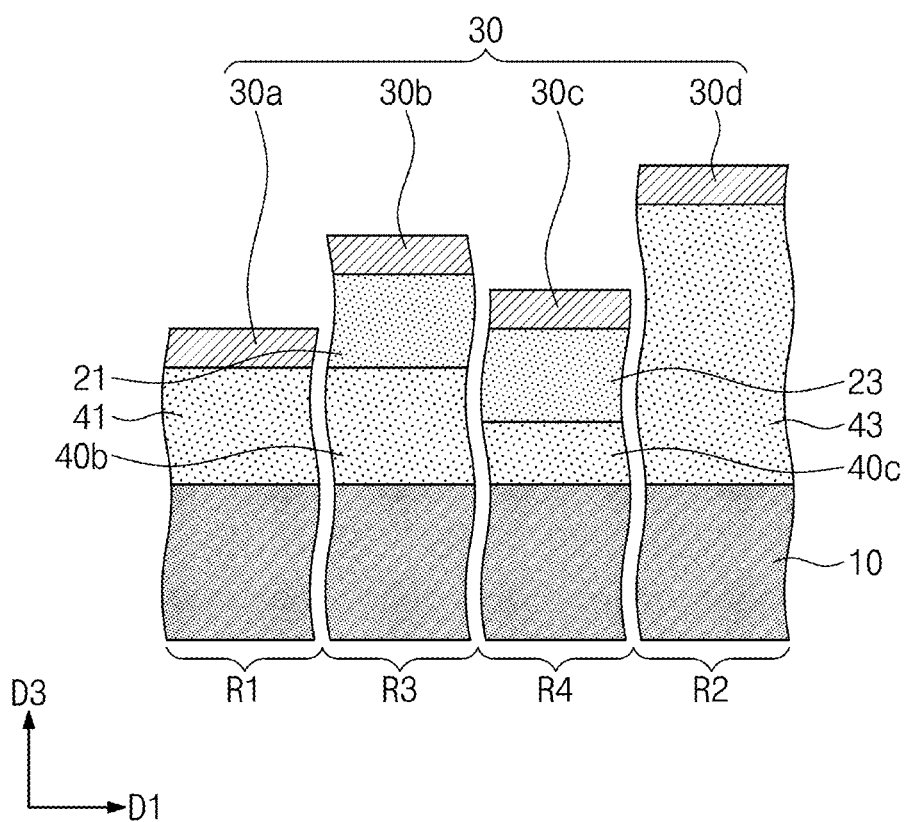

Referring to FIG. 5E, the thickness of the first inter-layer dielectric pattern 40b in the third direction D3 may be different from the thickness of the second inter-layer dielectric pattern 40c in the third direction D3, unlike the illustration of FIGS. 5C and 5D. A thickness of the first polymer pattern 21 in the third direction D3 may be substantially the same as a thickness of the second polymer pattern 23 in the third direction D3.

Figure 5F:
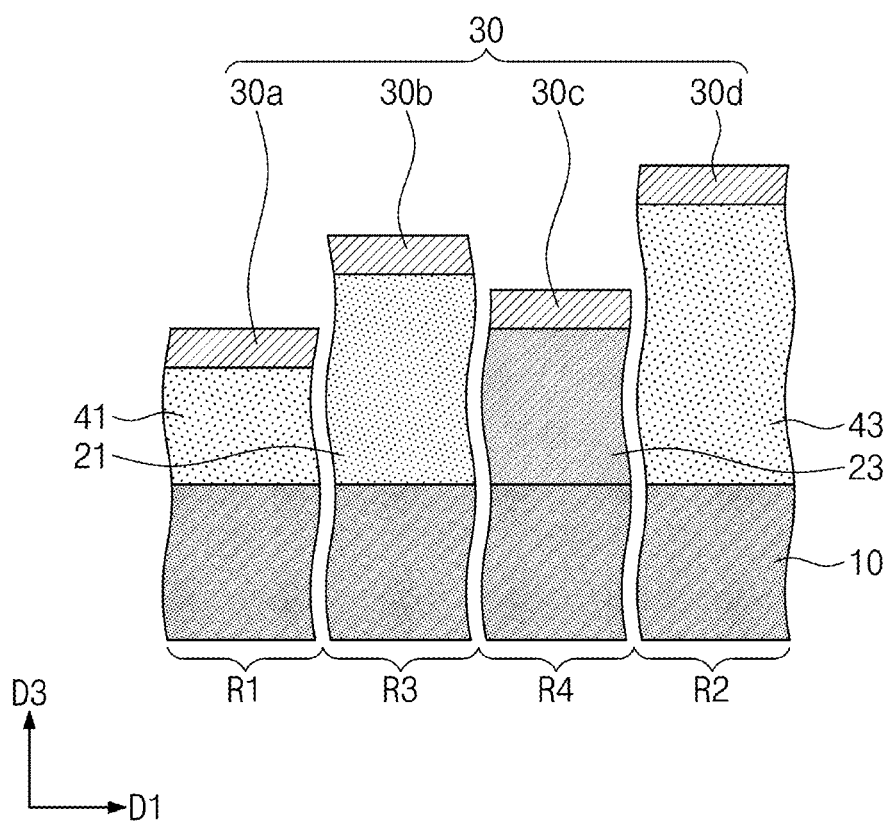

Referring to FIG. 5F, the first polymer pattern 21 may include a material different from that of the second polymer pattern 23, unlike the illustration of FIGS. 5C and 5D. Therefore, the thickness of the first and second polymer patterns 21 and 23 in the third direction D3 may differently change according to a change in an external environment. Furthermore, since permittivity of the first polymer pattern 21 may be different from permittivity of the second polymer pattern 23, wavelengths of reflected light may differ even if the first and second polymer patterns 21 and 23 have the same thickness in the third direction D3.

Figure 5G:
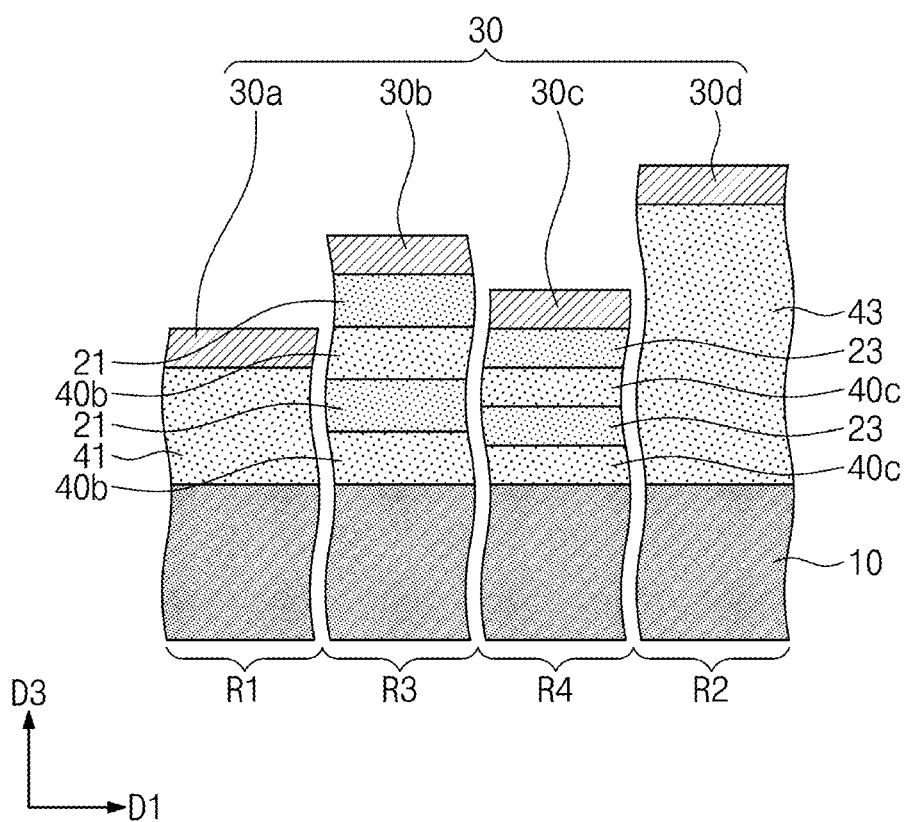
Figure 6A:
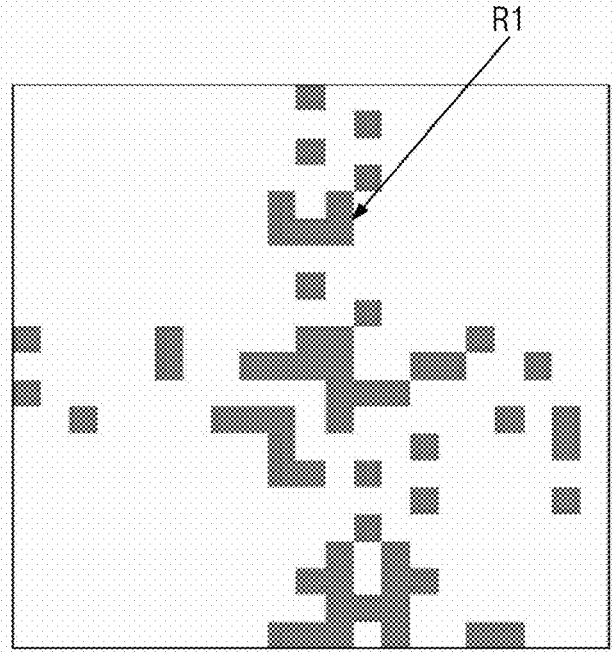
FIGS. 6A to 6D are diagrams for describing an operation principle of the security code of FIG. 5A.
Figure 6B:
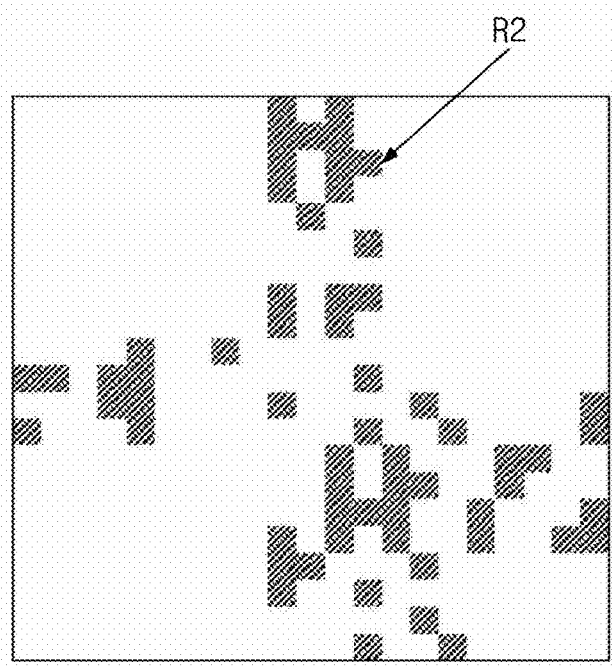
Figure 6C:
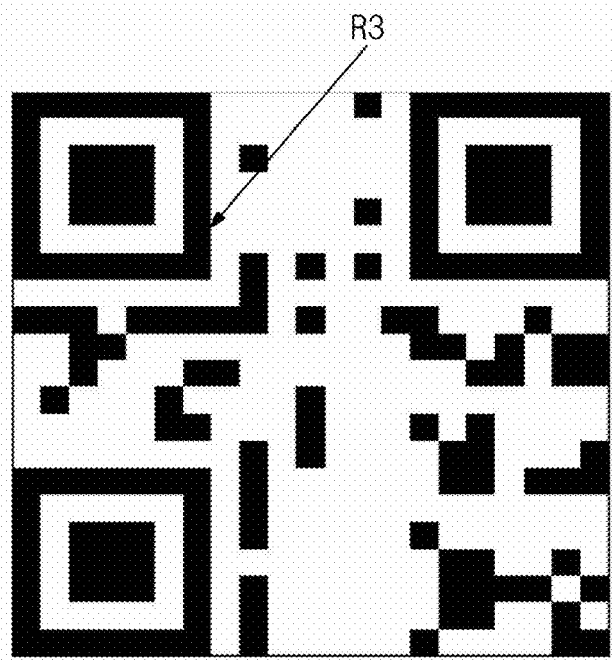
Figure 6D:
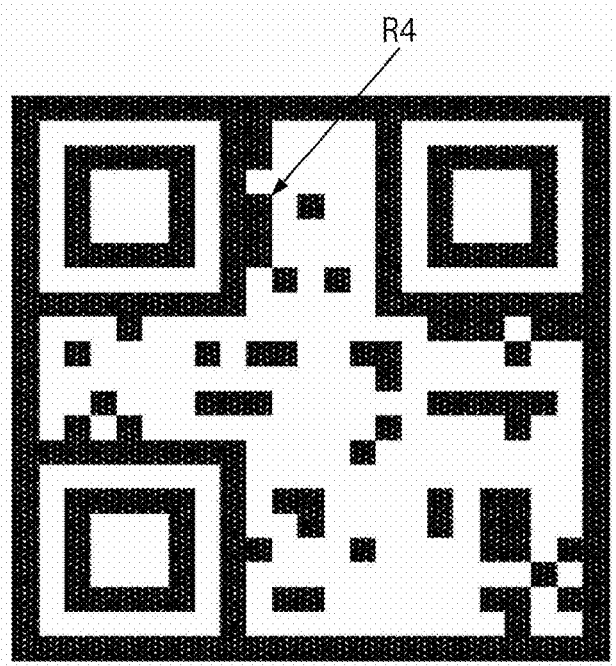

Referring to FIG. 5G, the security code may include a plurality of first inter-layer dielectric patterns 40b, a plurality of second inter-layer dielectric patterns 40c, a plurality of first polymer patterns 21, and a plurality of second polymer patterns 23. In the third region R3, the plurality of first inter-layer dielectric patterns 40b and the plurality of first polymer patterns 21 may be alternately laminated, thus forming a multi-layer structure. In the fourth region R4, the plurality of second inter-layer dielectric patterns 40c and the plurality of second polymer patterns 23 may be alternately laminated, thus forming a multi-layer structure. Alternatively, either the third region R3 or the fourth region R4 may not have a multi-layer structure.

FIGS. 6A to 6D are diagrams for describing an operation principle of the security code of FIG. 5A.

Referring to FIGS. 5B and 6A to 6D, the first and second regions R1 and R2 exhibit different colors, and are not provided with the first and second polymer patterns 21 and 23 and thus may not change in color according to a change in an external environment such as humidity, pressure, or temperature. On the contrary, the third and fourth regions R3 and R4 are provided with the first and second polymer patterns 21 and 23 and thus may change in color since a wavelength of reflected light may change according to an external environment.

For example, under a particular RH a % condition of low relative humidity, the thickness of the first dielectric pattern 41 in the third direction D3 and the thickness of the first polymer pattern 21 in the third direction D3 may be substantially the same, or, even if the thicknesses differ, there is a difference of permittivity therebetween, and thus the wavelengths of reflected light may be the same or similar. Therefore, light of the same or similar wavelengths may be reflected in the first region R1 and the third region R3, and thus color of the first region R1 of FIG. 6A may be the same as or similar to color of the third region R3 of FIG. 6C.

The thickness of the second dielectric pattern 43 in the third direction D3 and the thickness of the second polymer pattern 23 in the third direction D3 may be substantially the same, or, even if the thicknesses differ, there is a difference of permittivity therebetween, and thus the wavelengths of reflected light may be the same or similar. Therefore, light of the same or similar wavelengths may be reflected in the second region R2 and the fourth region R4, and thus color of the second region R2 of FIG. 6B may be the same as or similar to color of the fourth region R4 of FIG. 6D. That is, the first and third regions R1 and R3 having similar colors may form the code region, and the second and fourth regions R2 and R4 having similar colors may form the background region. Therefore, only the first data may be recognized.

On the contrary, under RH b % condition of high relative humidity, the thickness of the first dielectric pattern 41 in the third direction D3 and the thickness of the second polymer pattern 23 in the third direction D3 may be substantially the same, or, even if the thicknesses differ, there is a difference of permittivity therebetween, and thus the wavelengths of reflected light may be the same or similar. Therefore, light of the same or similar wavelengths may be reflected in the first region R1 of FIG. 6A and the fourth region R4 of FIG. 6D, and thus color of the first region R1 may be the same as or similar to color of the fourth region R4.

The thickness of the second dielectric pattern 43 in the third direction D3 and the thickness of the first polymer pattern 21 in the third direction D3 may be substantially the same, or, even if the thicknesses differ, there is a difference of permittivity therebetween, and thus the wavelengths of reflected light may be the same or similar. Therefore, light of the same or similar wavelengths may be reflected in the second region R2 of FIG. 6B and the third region R3 of FIG. 6C, and thus color of the second region R2 may be the same as or similar to color of the third region R3. That is, the first and fourth regions R1 and R4 having similar colors may form the background region, and the second and third regions R2 and R3 having similar colors may form the code region. Therefore, only the second data may be recognized.

Figure 7A:
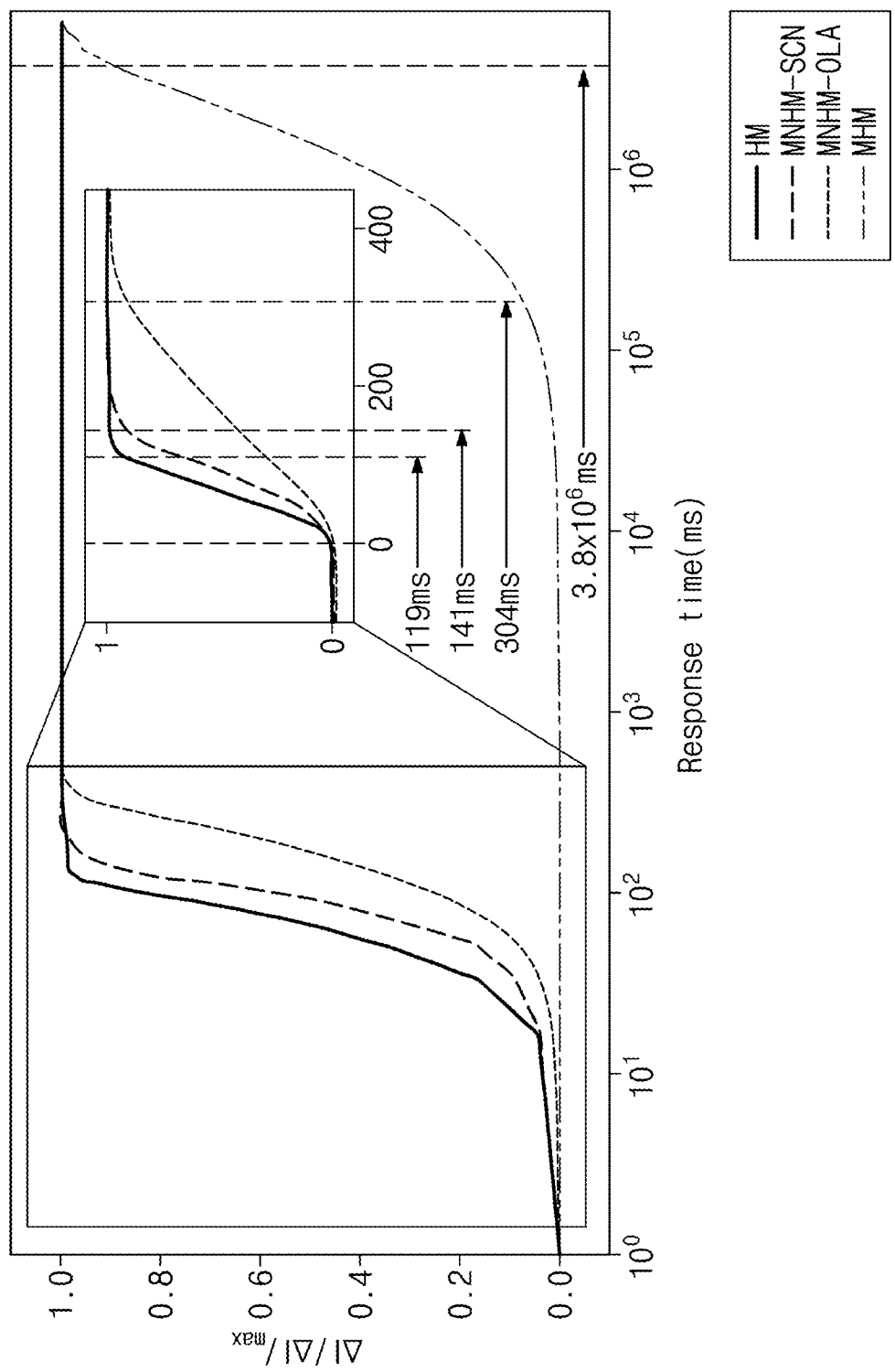
FIGS. 7A to 7C are graphs illustrating operation characteristics of a security code according to an embodiment of the inventive concept.
Figure 7B:
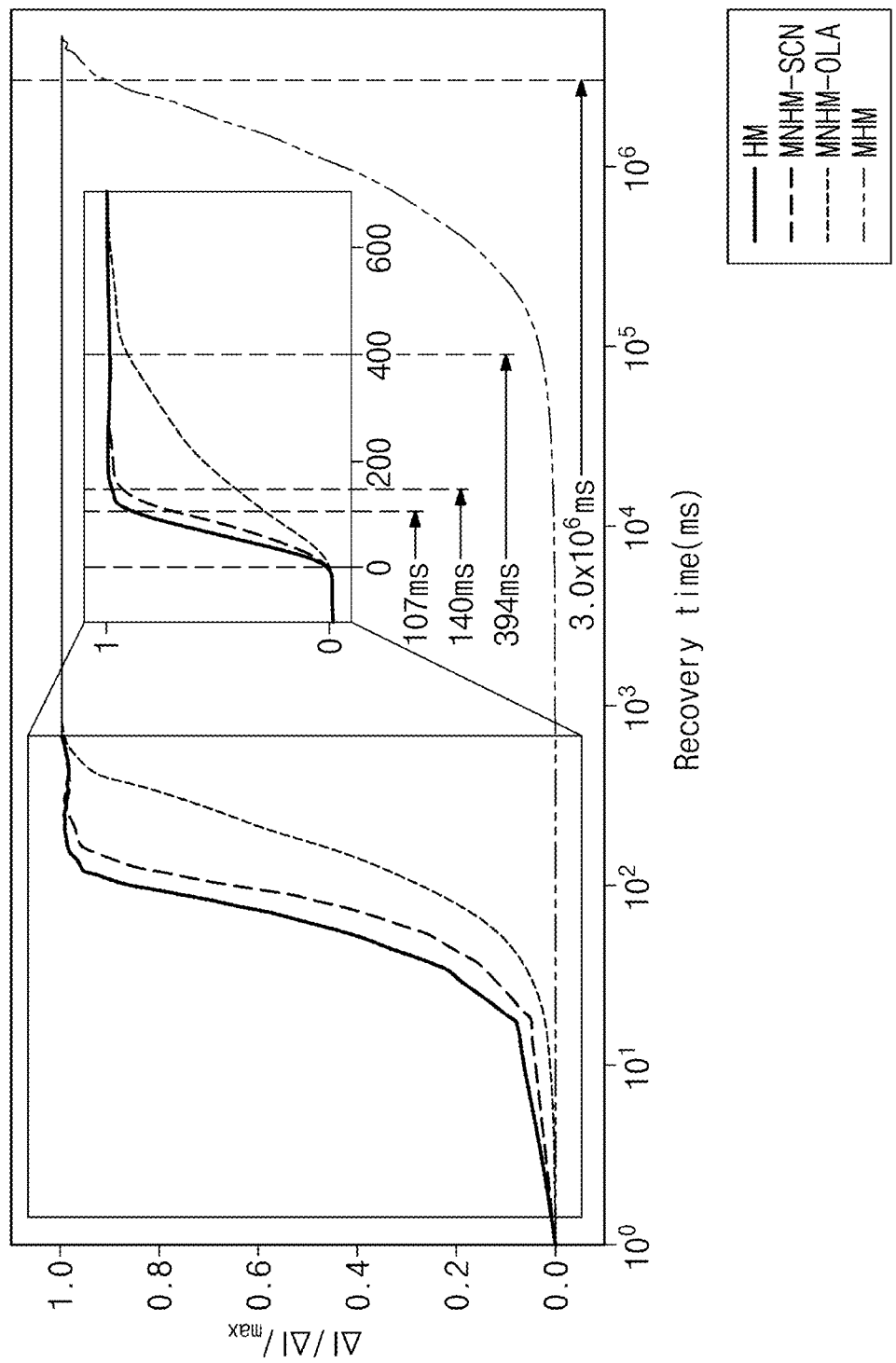
Figure 7C:
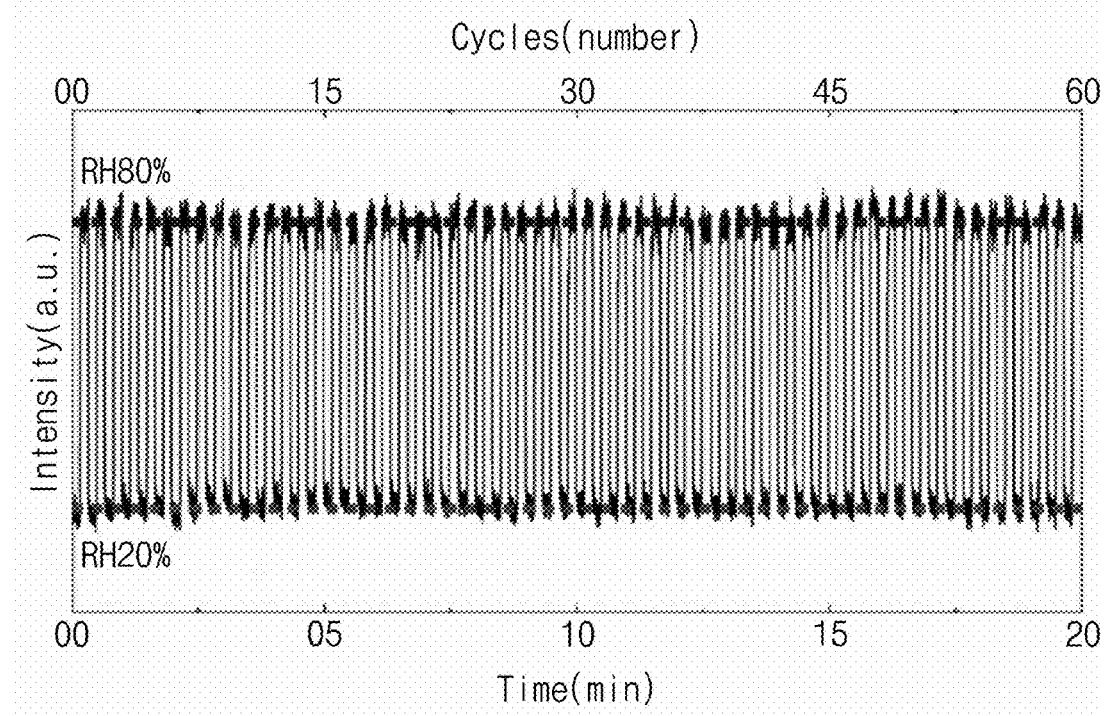

FIGS. 7A to 7C are graphs illustrating operation characteristics of a security code according to embodiments of the inventive concept.

Hereinafter, for convenience, descriptions that are the same as those provided above with reference to FIGS. 1A to 1E will not be provided, and differences will be described in detail.

Referring to FIG. 1B, the security code according to embodiments of the inventive concept may have an MNP-hydrogel-mirror (MNHM) structure. For example, the polymer pattern 20 may be chitosan hydrogel that reacts with moisture. The metal pattern 30 may include metal nanoparticles (MNPs). Therefore, the metal pattern 30 may be provided with membrane pores, and a size of the pores may be smaller or larger than a mean free path of gas molecules (e.g., $H_2O$). When the size of the pores is smaller than the mean free path of gas molecules, Knudsen diffusion may occur, and a probability of collision between the gas molecules and a wall may be higher than a probability of collision between the gas molecules.

Referring to FIGS. 7A and 7B, the security code may have a structure of hydrogel on a mirror (HM), (Ag-OLA)-hydrogel-mirror (MNHM-OLA), (Ag—SCN)-hydrogel-mirror (MNHM-SCN), and Ag film-hydrogel-mirror (MHM). Response and recovery time may change according to the structure of the security code. The response and recovery time may be defined as a time at which a 90% equilibrium state is reached. The response times of the HM, MNHM-SCN, MNHM-OLA, and MHM structures of embodiments of the inventive concept are about 119 ms, 141 ms, 304 ms, and 3,800,000 ms respectively. The recovery times of the HM, MNHM-SCN, MNHM-OLA, and MHM structures of embodiments of the inventive concept are about 107 ms, 140 ms, 394 ms, and 3,000,000 ms respectively. That is, since a polymer pattern is exposed in the MNHM structure according to embodiments of the inventive concept, a response speed of the MNHM structure may be about $10^4$ times faster than that of a typical film-type etalon. Furthermore, since the MNHN-SCN structure is a porous membrane structure, the response time of the MNHN-SCN structure may be about 160 ms faster than that of the MNHM-OLA structure.

Referring to FIG. 7C, a test is repeatedly carried out in environments with different humidity in order to check reliability of the security code. The different humidity may be, for example, about 20% and about 80%. A fixed time may be maintained in the environments with the different humidity. Intensity of light of the security code may be constant even when the environments with the different humidity are repeatedly provided. Although not illustrated, even when the security code is exposed to a high temperature and humidity state (e.g., temperature of about 85° C., relative humidity of about 85%), the security code may be optically and chemically stable.

Figure 8:
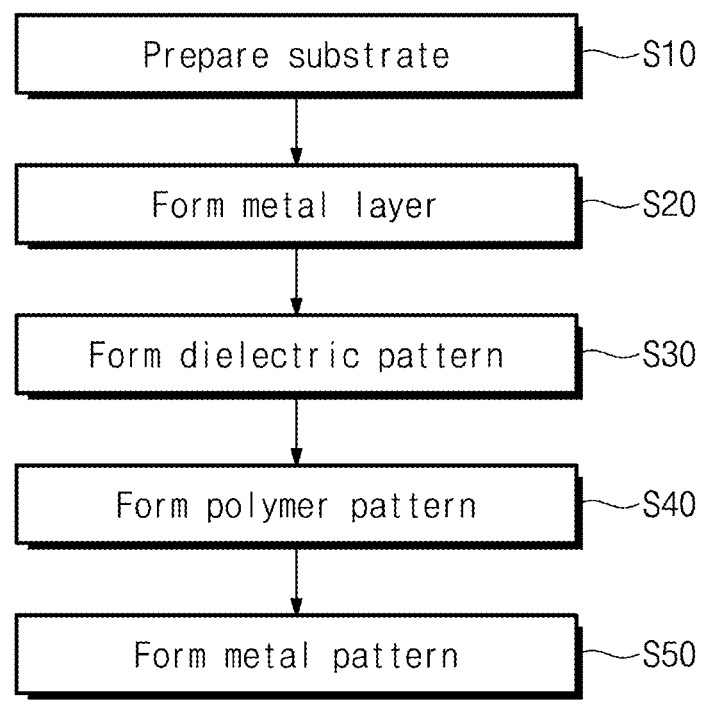
FIG. 8 is a flowchart illustrating a method of manufacturing a security code according to embodiments of the inventive concept.

FIG. 8 is a flowchart illustrating a method of manufacturing a security code according to embodiments of the inventive concept. FIGS. 9A to 9E are cross-sectional views illustrating a method of manufacturing a security code according to embodiments of the inventive concept.

Figure 9A:
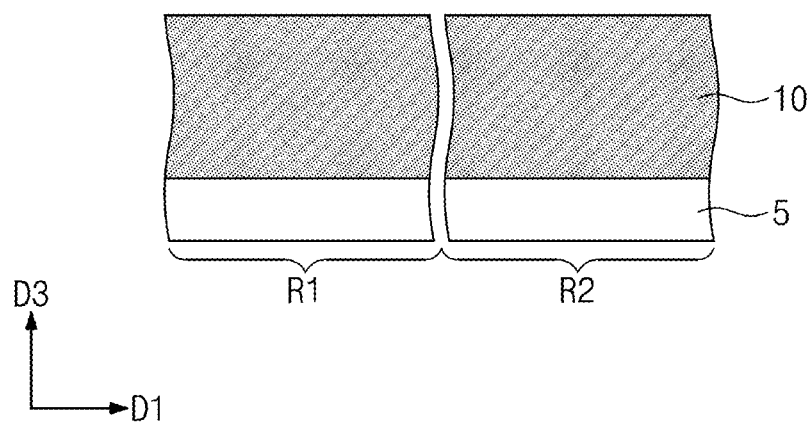
FIGS. 9A to 9E are cross-sectional views for describing a method of manufacturing a security code according to embodiments of the inventive concept.

Referring to FIGS. 8 and 9A, a substrate 5 may be provided. Preparing the substrate 5 (S10) may include washing the substrate 5 and drying the substrate 5 using nitrogen (N2). Washing the substrate 5 may be performed using at least one of distilled water, acetone, or isopropanol.

The metal layer 10 may be formed on the substrate 5 (S20). The metal layer 10 may be formed through a deposition process. The deposition process may be, for example, an e-beam evaporation process. A thickness of the metal layer 10 may be about 100 nm. The metal layer 10 may include a metal material, which may be aluminum (Al).

Figure 9B:
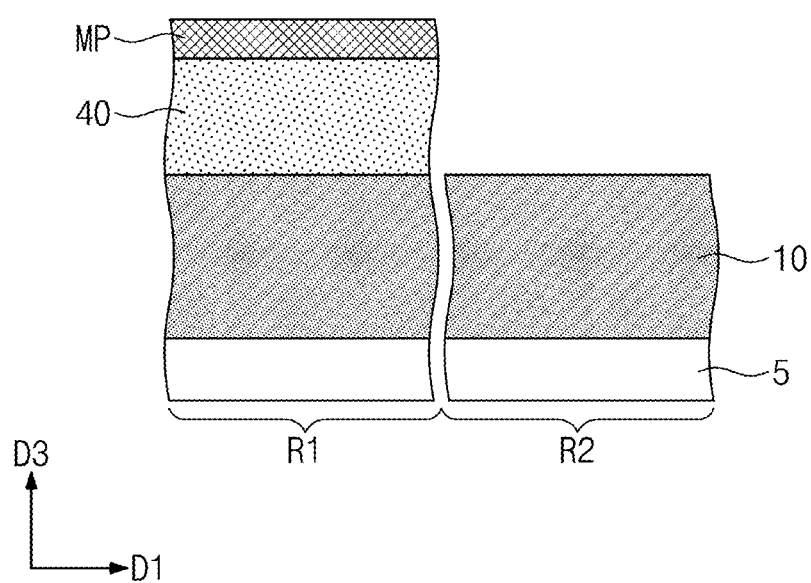

Referring to FIGS. 8 and 9B, the dielectric pattern 40 may be formed on the metal layer 10 (S30). Forming the dielectric pattern 40 may include depositing a dielectric layer (not shown), forming a mask pattern MP, and etching the dielectric layer. The dielectric layer may be formed on the metal layer 10. For example, forming the dielectric layer may be performed through a plasma enhanced chemical vapor deposition (PECVD) process. A thickness of the dielectric layer may be about 500 nm. The dielectric layer may include an insulating layer, which may be $SiO_2$.

The mask pattern MP may be formed by forming a photoresist PR film on the dielectric layer and thereafter performing a lithography process. A thickness of the PR film may be about 1.03 μm. The PR film may include, for example, PFi38A. The PR film in the second region R2 may be removed by performing a lithography process. Therefore, the mask pattern MP may be formed on the dielectric layer in the first region R1.

The dielectric layer may be etched using the mask pattern MP as a mask. The dielectric layer may be formed as the dielectric pattern 40 through an etching process. The dielectric pattern 40 may be present only in the first region R1. For example, an etch rate of the etching process may be about 5 Å/s. A thickness of the dielectric pattern 40 may be about 180 nm to about 280 nm after the etching process.

Figure 9C:
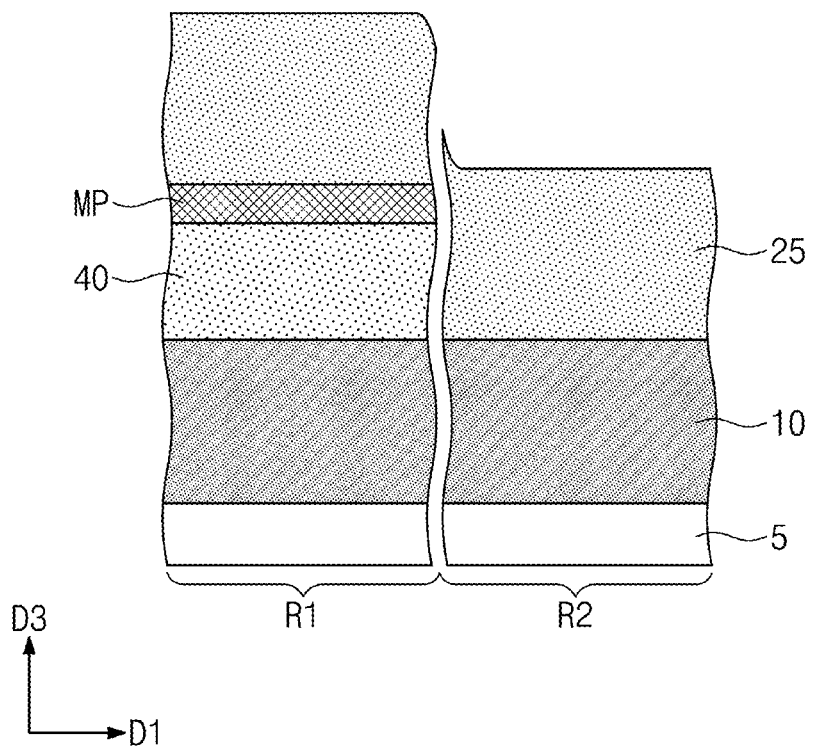
Figure 9D:
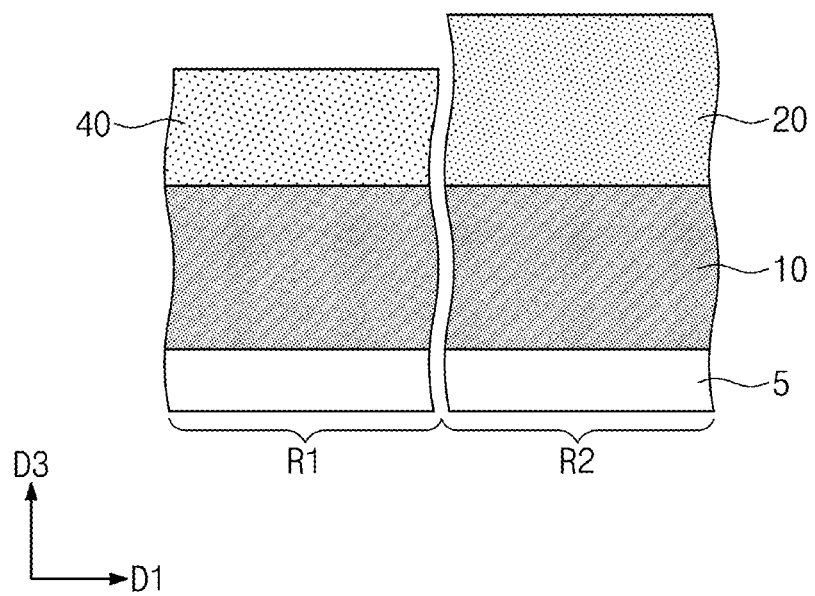

Referring to FIGS. 8, 9C, and 9D, forming the polymer pattern 20 (S40) may include depositing a polymer layer 25 and performing a lift-off process.

Depositing the polymer layer 25 may be performed through a spin coating process using a solution. In detail, a chitosan solution may be prepared by dissolving chitosan powder in distilled water containing acetic acid. The chitosan solution may be centrifuged for a fixed time after being stirred using a heating stirrer. Thereafter, the chitosan solution may be sequentially filtered by a syringe filter. The filtered chitosan solution may be formed as a chitosan thin film (not shown) on the mask pattern and a portion of the metal layer through a spin coating process. Thereafter, the chitosan thin film may be formed as the polymer layer 25 through a drying process and a deprotonation process using an ammonia solution. Since the dielectric pattern 40 and the mask pattern MP are provided in the first region R1, the polymer layer 25 in the first region R1 may be higher in level than the polymer layer 25 in the second region R2.

The lift-off process may be performed using an acetone solution. In detail, the acetone solution may remove the mask pattern MP in the first region R1. When the mask pattern MP is removed, the polymer layer 25 on the mask pattern MP in the first region R1 may also be removed. That is, although the polymer layer 25 in the first region R1 is removed, the polymer layer 25 in the second region R2 may remain. Therefore, the polymer layer 25 may be formed as the polymer pattern 20. After the lift-off process is performed, the thickness of the polymer pattern 20 may be about 140 nm.

Figure 9E:
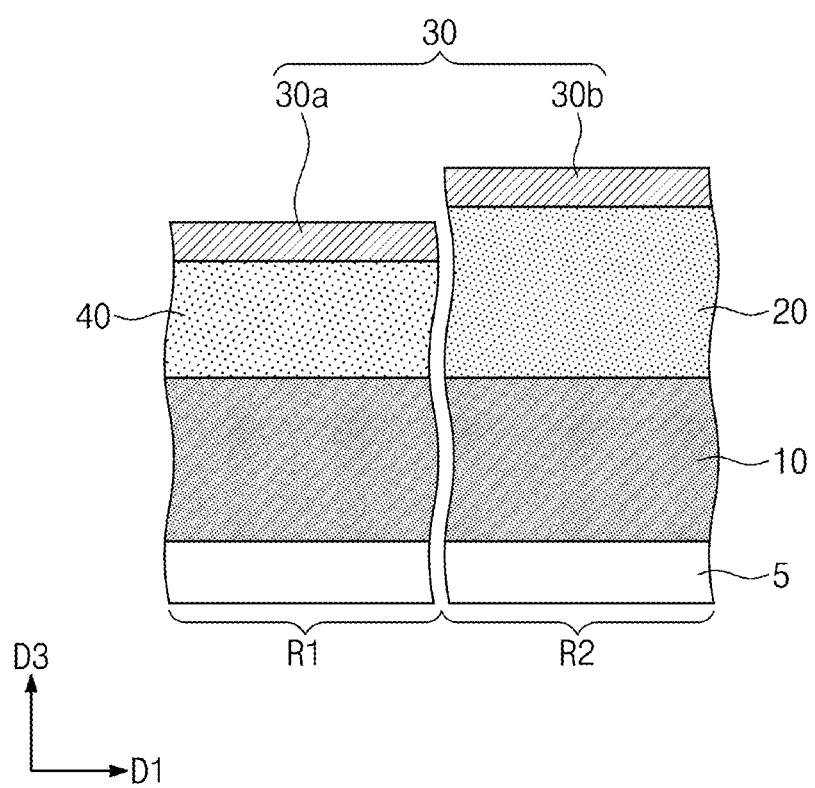

Referring to FIGS. 8 and 9E, the first metal pattern 30a may be formed on the dielectric pattern 40 in the first region R1. The second metal pattern 30b may be formed on the polymer pattern 20 in the second region R2 (S50). In detail, an Ag nanoparticle solution may be provided. The Ag nanoparticle solution may include OLA ligands. The Ag nanoparticle solution may be filter by a syringe filter. The filtered Ag nanoparticle solution may be formed as an Ag-OLA thin film on the polymer pattern 20 and the dielectric pattern 40 through a spin coating process. Thereafter, the substrate 5e may be dipped into a solution containing ammonium thiocyanate. Due to the ammonium thiocyanate, OLA ligands may change to SCN ligands, thus forming the metal pattern 30. That is, the first and second metal patterns 30a and 30b may be simultaneously formed.

According to embodiments of the inventive concept, a plurality of pieces of information may be included for each changed color by using a Fabry-Perot resonance structure, in which a polymer pattern that expands or contracts according to a change in an external environment such as humidity, temperature, or pressure is applied, and information may be blocked or exposed according to a change in an external environment. Therefore, embodiments of the inventive concept may be applied in various fields of personal information, groceries, pharmaceuticals, cosmetics, home appliances, and the like in which a plurality of pieces of information (e.g., personal information, ingredients, expiration date, manufacturing method, usage method, etc.) are required to be provided.

A security code according to embodiments of the inventive concept may be made very thin and allow a solution process, and thus may be manufactured with a large area size and applied to various surfaces. Furthermore, the security code may be formed within a size of hundreds of nanometers by using a pattern process such as photolithography and nanoimprint, and thus may be applied to a micro security pattern.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A security code including a first region and a second region, the security code comprising:
   a metal layer;
   a first dielectric pattern provided on the metal layer in the first region;
   a polymer pattern provided on the metal layer in the second region;
   a first metal pattern provided on the dielectric pattern; and
   a second metal pattern provided on the polymer pattern,
   wherein the polymer pattern includes a material different from that of the first dielectric pattern, and a thickness of the polymer pattern is different from a thickness of the first dielectric pattern.

2. The security code of claim 1, wherein the polymer pattern includes a contractable or expandable material.

3. The security code of claim 1, further comprising an inter-layer dielectric pattern between the metal layer and the second metal pattern in the second region, wherein the inter-layer dielectric pattern is provided on or below the polymer pattern.

4. The security code of claim 3, wherein the polymer pattern and the inter-layer dielectric pattern are provided in plurality and alternately laminated.

5. The security code of claim 1, further comprising:
   a third region spaced apart from the first region;
   a second dielectric pattern provided on the metal layer in the third region; and
   a third metal pattern on the second dielectric pattern.

6. The security code of claim 5, wherein the thickness of the first dielectric pattern is different from a thickness of the second dielectric pattern.

7. The security code of claim 5, wherein at least one of the thicknesses of the first and second dielectric patterns is the same as the thickness of the polymer pattern.

8. The security code of claim 1, wherein the polymer pattern includes at least one of silk protein, chitosan, cellulose, PVA, or hydrogel complex.

9. The security code of claim 5, wherein the first dielectric pattern includes a material different from that of the second dielectric pattern.

10. The security code of claim 1, wherein the metal layer includes at least one of Ag, Au, Cu, Al, Ni, Cr, or Pb.

11. The security code of claim 1, wherein the first dielectric pattern includes at least one of $SiO_2$, $Ai_2O_3$, $TiO_2$, SOG, PMMA, or PBMA.

12. A security code comprising:
   a metal layer including a first region, a second region, a third region, and a fourth region;
   a first dielectric pattern provided on the metal layer in the first region;
   a second dielectric pattern provided on the metal layer in the second region;
   a first polymer pattern provided on the metal layer in the third region;
   a second polymer pattern provided on the metal layer in the fourth region;
   a first metal pattern provided on the first dielectric pattern;
   a second metal pattern provided on the second dielectric pattern;
   a third metal pattern provided on the first polymer pattern; and
   a fourth metal pattern provided on the second polymer pattern,
   wherein the first to fourth regions are provided at different positions, and the first and second polymer patterns include an expandable or contractable material.

13. The security code of claim 12, wherein a thickness of the first dielectric pattern is different from a thickness of the second dielectric pattern, and a thickness of the first polymer pattern is different from a thickness of the second polymer pattern.

14. The security code of claim 12, wherein either one of thicknesses of the first and second dielectric patterns is the same as either one of thicknesses of the first and second polymer patterns.

15. The security code of claim 12, wherein the first polymer pattern includes a material different from that of the second polymer pattern.

16. The security code of claim 12, further comprising:
   a first inter-layer dielectric pattern provided between the metal layer and the third metal pattern in the third region; and
   a second inter-layer dielectric pattern provided between the metal layer and the fourth metal pattern in the fourth region,
   wherein the first inter-layer dielectric pattern is provided on or below the first polymer pattern, and the second inter-layer dielectric pattern is provided on or below the second polymer pattern.

17. The security code of claim 16,
   wherein the first and second inter-layer dielectric patterns include at least one of $SiO_2$, $Ai_2O_3$, $TiO_2$, SOG, PMMA, or PBMA, and
   a thickness of the first inter-layer dielectric pattern is different from a thickness of the second inter-layer dielectric pattern.

* * * * *